United States Patent
Oike

(10) Patent No.: US 9,344,680 B2
(45) Date of Patent: May 17, 2016

(54) SERVER AND NON-TRANSITORY COMPUTER READABLE MEDIUM STORING PROGRAM FOR REMOTE CONFERENCE

(71) Applicant: Brother Kogyo Kabushiki Kaisha, Nagoya-shi, Aichi-ken (JP)

(72) Inventor: Kenji Oike, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/581,845

(22) Filed: Dec. 23, 2014

(65) Prior Publication Data

US 2015/0189236 A1  Jul. 2, 2015

(30) Foreign Application Priority Data

Dec. 27, 2013  (JP) ................................ 2013-270727

(51) Int. Cl.
*H04N 7/15* (2006.01)
*H04L 29/06* (2006.01)

(52) U.S. Cl.
CPC .............. *H04N 7/152* (2013.01); *H04L 65/403* (2013.01); *H04L 65/604* (2013.01); *H04L 65/607* (2013.01)

(58) Field of Classification Search
CPC ........ H04N 7/15; H04N 7/152; H04L 65/604; H04L 65/607
USPC .......... 348/14.01, 14.03, 14.06, 14.07, 14.16, 348/58, 207.1, 222.1, 14.09, 231.2; 358/474; 455/456.3; 707/618; 709/217; 345/99; 370/252
See application file for complete search history.

(56) References Cited

U.S. PATENT DOCUMENTS

| | | | |
|---|---|---|---|
| 5,371,536 A | 12/1994 | Yamaguchi | |
| 5,568,184 A | 10/1996 | Shibata et al. | |
| 6,078,349 A | 6/2000 | Molloy | |
| 7,479,983 B2* | 1/2009 | Fisher | H04N 1/00209 348/207.1 |
| 7,511,742 B2* | 3/2009 | Ito | H04N 5/23293 348/231.2 |
| 7,882,199 B2* | 2/2011 | Ludtke | G01S 15/89 709/217 |
| 7,920,159 B2 | 4/2011 | Ueno et al. | |

(Continued)

FOREIGN PATENT DOCUMENTS

| | | |
|---|---|---|
| JP | 2007-150921 A | 6/2007 |
| JP | 2010-035248 A | 2/2010 |
| JP | 2010-157083 A | 7/2010 |

OTHER PUBLICATIONS

Dec. 23, 2014—(US) Co-pending U.S. Appl. No. 14/581,780.

(Continued)

*Primary Examiner* — Gerald Gauthier
(74) *Attorney, Agent, or Firm* — Banner & Witcoff, Ltd.

(57) ABSTRACT

A server obtains video data and layout information. The layout information includes at least a portion of identification information and status information associated with each other. The status information relates to a display condition of each of a plurality of captured images in a video display region. The server judges whether a specific captured image is included in the video display region. The server determines update frequency information when the specific captured image is not included in the video display region. The update frequency information sets a portion of a plurality of inter-frame coded image data included in the video data of the second communication device as a non-target for transmission. The server transmits the video data in which the portion of the plurality of inter-frame coded image data are not included.

15 Claims, 15 Drawing Sheets

(56) References Cited

U.S. PATENT DOCUMENTS

| | | | |
|---|---|---|---|
| 7,999,781 B2* | 8/2011 | Inada | G09G 3/3611 345/99 |
| 8,233,200 B2* | 7/2012 | Metayer | G06K 7/10722 348/222.1 |
| 8,416,280 B2* | 4/2013 | Oike | H04L 12/1822 340/4.37 |
| 8,417,233 B2 | 4/2013 | Woloshyn | |
| 8,483,715 B2* | 7/2013 | Chen | G06F 17/30247 348/207.1 |
| 8,531,541 B2* | 9/2013 | Terashima | G06F 17/3028 348/222.1 |
| 8,581,956 B2* | 11/2013 | Robinson | H04N 7/15 348/14.06 |
| 8,675,038 B2* | 3/2014 | Wessling | H04N 7/15 348/14.01 |
| 8,787,187 B2* | 7/2014 | Nakamura | G01R 31/08 370/252 |
| 8,791,977 B2* | 7/2014 | Marvit | H04N 7/15 348/14.01 |
| 8,823,769 B2* | 9/2014 | Sekine | H04N 7/15 348/14.16 |
| 8,848,022 B2* | 9/2014 | Yasoshima | H04N 7/15 348/14.07 |
| 9,124,765 B2* | 9/2015 | Zhang | H04N 7/15 |
| 2003/0235399 A1 | 12/2003 | Kawahara | |
| 2004/0008249 A1 | 1/2004 | Nelson et al. | |
| 2007/0199076 A1 | 8/2007 | Rensin et al. | |
| 2009/0309897 A1 | 12/2009 | Morita et al. | |
| 2011/0222676 A1 | 9/2011 | Okada et al. | |
| 2012/0062688 A1* | 3/2012 | Shen | H04N 7/147 348/14.03 |
| 2013/0010092 A1* | 1/2013 | Wang | G02B 27/26 348/58 |
| 2015/0095281 A1* | 4/2015 | Nieminen | G06F 17/30377 707/618 |
| 2015/0103885 A1 | 4/2015 | Feng et al. | |
| 2015/0156459 A1 | 6/2015 | Sugiura | |
| 2015/0189235 A1* | 7/2015 | Oike | H04L 65/604 348/14.07 |
| 2015/0189236 A1* | 7/2015 | Oike | H04N 7/152 348/14.07 |

OTHER PUBLICATIONS

Dec. 21, 2015—(US) Notice of Allowance—U.S. Appl. No. 14/581,780.

* cited by examiner

Fig. 3

| ID INFORMATION (TARGET) | STATUS INFORMATION | |
|---|---|---|
| | POSITION INFORMATION | TOTAL VIDEO PLAY TIME [sec.] |
| 71 | 0 | 100.1 |
| 72 | 0 | 300.1 |
| 73 | 1 | 300.0 |
| 74 | 1 | 200.0 |
| 75 | 2 | 0.0 |

Fig. 11

| ID INFORMATION (SENDER) | POSITION INFORMATION | | | | | | ID INFORMATION (TARGET) TOTAL VIDEO PLAY TIME [sec.] | | | | | |
|---|---|---|---|---|---|---|---|---|---|---|---|---|
| | 30 | 71 | 72 | 73 | 74 | 75 | 30 | 71 | 72 | 73 | 74 | 75 |
| 30 | - | 0 | 0 | 1 | 1 | 2 | - | 100.1 | 300.1 | 300.0 | 200.0 | 0.0 |
| 71 | 1 | - | 0 | 0 | 1 | 1 | 150.0 | - | 300.1 | 300.1 | 100.0 | 50.0 |
| 72 | 0 | 0 | - | 1 | 1 | 2 | 200.1 | 300.1 | - | 100.0 | 100.0 | 50.0 |
| 73 | 0 | 0 | 1 | - | 1 | 2 | 300.1 | 150.0 | 100.0 | 100.0 | 100.0 | 0.0 |
| 74 | 2 | 1 | 1 | 0 | - | 0 | 0.0 | 150.0 | 300.0 | 300.1 | - | 150.1 |
| 75 | 2 | 1 | 1 | 0 | 0 | - | 50.0 | 150.0 | 100.0 | 300.1 | 200.1 | - |

Fig. 12

| ID INFORMATION (SENDER) | ID INFORMATION (TARGET) | | | | | |
|---|---|---|---|---|---|---|
| | 30 | 71 | 72 | 73 | 74 | 75 |
| 30 | - | 5 | 5 | 3 | 1 | 1 |
| 71 | 3 | - | 5 | 5 | 2 | 1 |
| 72 | 2 | 5 | - | 5 | 2 | 1 |
| 73 | 5 | 5 | 5 | - | 2 | 1 |
| 74 | 5 | 5 | 2 | 3 | - | 1 |
| 75 | 1 | 2 | 3 | 5 | 4 | - |

Fig. 13

| UPDATE FREQUENCY INFORMATION | COMPRESSED IMAGE | | MINIMUM I-FRAME TRANSMISSION INTERVAL [msec.] |
|---|---|---|---|
| | TARGET FOR TRANSMISSION | NON-TARGET FOR TRANSMISSION | |
| 1 | NONE | I-FRAME, P-FRAME & B-FRAME | 0 |
| 2 | I-FRAME | P-FRAME & B-FRAME | 2000 |
| 3 | I-FRAME | P-FRAME & B-FRAME | 300 |
| 4 | I-FRAME & P-FRAME | B-FRAME | 0 |
| 5 | I-FRAME, P-FRAME & B-FRAME | NONE | 0 |

Fig. 14

| ID INFORMATION | TOTAL AUDIO PLAY TIME [sec.] |
|---|---|
| 30 | 10.00 |
| 71 | 20.02 |
| 72 | 100.00 |
| 73 | 120.00 |
| 74 | 40.02 |
| 75 | 0.00 |

# SERVER AND NON-TRANSITORY COMPUTER READABLE MEDIUM STORING PROGRAM FOR REMOTE CONFERENCE

CROSS-REFERENCES TO RELATED APPLICATION

This application claims priority to Japanese Patent Application No. 2013-270727 filed on Dec. 27, 2013, the content of which is herein incorporated by reference in its entirety.

TECHNICAL FIELD

Aspects relate to a server, a method, and a non-transitory storage medium storing programs, for performing a remote conference using a plurality of communication devices via a network.

BACKGROUND

There has been known a technique relating to a remote conference. For example, a known communication device is installed at each location for a television conference in a television conference system. In the television conference system, each communication device is connected to the other communication devices to perform a television conference. Each communication device includes a monitor, on which a plurality of windows is displayed. Upon receipt of moving image data from one or more other communication devices installed at other respective locations, a communication device displays moving images of the respective locations in respective windows on the monitor. In the communication device, for example, when a size of a window in which a moving image is displayed is reduced, a control command for decreasing a frame rate or resolution of moving image data is generated. For another example, when a window is dismissed, a control command for stopping transmission of moving image data is generated. Such a control command is transmitted to a communication device that sent the moving image data.

SUMMARY

A remote conference may be performed using a plurality of communication devices connected to a network. Data of video and audio in a remote conference may be communicated between the plurality of the communication devices via the server connected to the network. Each communication device may display captured images corresponding to a plurality of pieces of video data transmitted from the other communication devices. The number of captured images to be displayed in each communication device may increase with an increase in number of communication devices to be used (e.g., locations) in a remote conference. In some cases, the captured images of all the locations might not be displayed on a monitor at the same time in a communication device. In order to display one or more hidden captured images on the monitor, a user of the communication device may input, into the communication device, an instruction to move one or more captured images, through an operation for changing one or more captured images to be displayed (e.g., scrolling, swiping, and/or changing a tab). In response to the instruction, the communication device may display the one or more hidden captured images. When the communication device receives such an instruction while receipt of video data corresponding to the one or more hidden captured images has been stopped, the communication device starts receiving the corresponding video data in response to the instruction. Video data includes an intra-frame coded image data and an inter-frame coded image data. The intra-frame coded image data may be decoded without reference to information of another frame. In contrast to this, for example, an inter-frame coded image data may be decoded with reference to information of an intra-frame coded image data. Therefore, if the communication device receives an inter-frame coded image data in response to the moving instruction, the communication device might not decode video data until the communication device receives an intra-frame coded image data. Owing to this, a captured image corresponding to the video data might not be displayed until the communication device receives an intra-frame coded image data, whereby a hidden captured image might not be displayed smoothly in response to the changing operation in some cases.

Some embodiments provide for a server and a non-transitory storage medium storing programs for a remote conference, which may enable one or more hidden captured images to appear smoothly in a particular communication device while restricting increase of an amount of video data to be transmitted to the communication device.

An aspect of the present disclosure is a server. The server obtains a plurality of video data and layout information. The layout information includes at least a portion of a plurality of identification information and a plurality of status information associated with each other. Each of the status information relates to a display condition of each of a plurality of captured images in a video display region. The server judges whether a specific captured image is included in the video display region. The server determines update frequency information when the specific captured image is not included in the video display region. The update frequency information sets a portion of a plurality of inter-frame coded image data included in the video data of the second communication device as non-target for transmission. The server transmits the video data in which the portion of the plurality of inter-frame coded image data are not included.

DESCRIPTION OF THE DRAWINGS

Aspects of the disclosure are illustrated by way of example and not by limitation in the accompanying figures in which like reference characters indicate similar elements.

FIG. 3 illustrates an example status table in the illustrative embodiment according to one or more aspects of the disclosure.

FIG. 11 illustrates example layout information stored in the server in the illustrative embodiment according to one or more aspects of the disclosure.

FIG. 12 illustrates an example update frequency setting stored in the server in the illustrative embodiment according to one or more aspects of the disclosure.

FIG. 13 is an explanatory diagram for explaining an update rule in the illustrative embodiment according to one or more aspects of the disclosure.

FIG. 14 illustrates an example total audio play time table in the illustrative embodiment according to one or more aspects of the disclosure.

DETAILED DESCRIPTION

Hereinafter, an illustrative embodiment for implementing one or more aspects of the disclosure will be described with reference to the accompanying drawings. The disclosure is not limited to specific embodiments, but various aspects may be adopted in the same technical idea. For example, one or more aspects of the disclosure may be omitted or replaced with another one. The disclosure may include another aspect as well as the disclosure.

<Remote Conference System>

Figure 1:
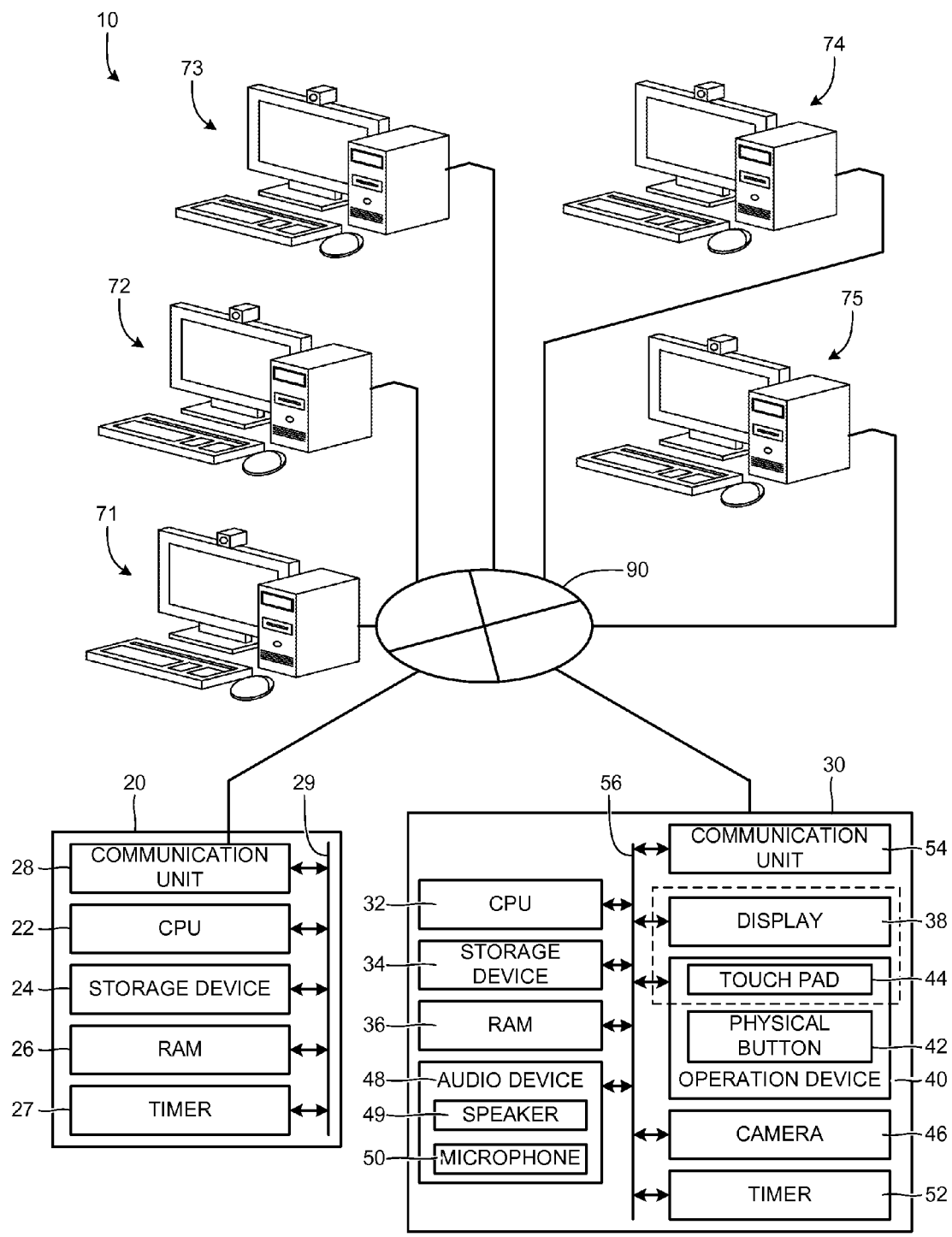
FIG. 1 illustrates an example remote conference system in an illustrative embodiment according to one or more aspects of the disclosure.

A remote conference system 10 will be described referring to FIGS. 1, 2, and 3. As depicted in FIG. 1, the remote conference system 10 includes a server 20 and a plurality of, for example, six communication devices 30, 71, 72, 73, 74, and 75. Hereinafter, a remote conference performed among parties using the communication devices 30, 71, 72, 73, 74, and 75, respectively, will be described. In other embodiments, for example, a remote conference using the remote conference system 10 may be performed among parties using five or less communication devices or using seven or more communication devices.

The server 20 and the communication devices 30, 71, 72, 73, 74, and 75 are connected to a network 90. The network 90 may be, for example, the Internet. A remote conference using the communication devices 30, 71, 72, 73, 74, and 75 may be performed via the server 20 similar to a Web conference using a known remote conference system.

The communication device 30 has a function of performing communication via the network 90. The communication device 30 may be, for example, a smartphone, a tablet terminal, or a personal computer. In this illustrative embodiment, the communication device 30 may be a mobile device, such as a smartphone or a tablet terminal. A detailed configuration of the communication device 30 will be described later. The communication devices 71, 72, 73, 74, and 75 may be a known communication device. For example, one or more or all of the communication devices 71, 72, 73, 74, and 75 may be a communication device that is the same as the communication device 30. In other embodiments, for example, the communication devices 71, 72, 73, 74, and 75 may be a personal computer. At a remote conference, the communication devices 71, 72, 73, 74, and 75 are configured to execute each processing that the communication device 30 executes (refer to FIGS. 4, 7, 8, 9, and 10). In the illustrative embodiment, a description will be made by taking the communication device 30 as an example.

In the remote conference system 10, for example, the communication device 30 transmits video data and audio data to the server 20. The video data transmitted from the communication device 30 corresponds to an image captured using the communication device 30 (hereinafter, referred to as "captured image"). The audio data transmitted from the communication device 30 corresponds to audio collected using the communication device 30. The communication device 71 also transmits video data and audio data to the server 20. The video data transmitted from the communication device 71 corresponds to an image captured using the communication device 71. The audio data transmitted from the communication device 71 corresponds to audio collected using the communication device 71. Similar to the communication device 71, each of the communication devices 72, 73, 74, and 75 transmit, to the server 20, video data corresponding to an image captured using each of the communication devices 72, 73, 74, and 75 and audio data corresponding to audio collected using each of the communication devices 72, 73, 74, and 75. The server 20 transmits the video data and audio data, which are received from the communication devices 30, 71, 72, 73, 74, and 75, to appropriate destination devices, respectively. The destination device refers to each of the communication device 30 and the communication devices 71, 72, 73, 74, and 75 other than the sender device that transmits video data and audio data. For example, the server 20 transmits video data and audio data, which are received from the communication device 30, to each of the communication devices 71, 72, 73, 74, and 75. The server 20 does not transmit the video data and the audio data, which are received from the communication device 30, to the communication device 30, which is the sender device of the video data and the audio data. In other words, in the remote conference system 10, the video data and audio data transmitted from the communication device 30 are delivered to each of the communication devices 71, 72, 73, 74, and 75 via the server 20 using a streaming method. The video data and audio data transmitted from each of the communication devices 71, 72, 73, 74, and 75 are delivered to the communication device 30 via the server 20 using the streaming method.

Video data may be moving image data compressed using a predetermined compression method. The compression method may be, for example, the H.264 video compression method. The video data according to the illustrative embodiment includes an intra-frame coded image data and an inter-frame coded image data, similar to known video data. A frame rate of video data may be, for example, 30 fps. The intra-frame coded image data includes an I-frame (intra-coded frame). The inter-frame coded image data includes a P-frame (predicted frame) and a B-frame (bi-directional predicted frame). The I-frame is an image coded without using inter-frame prediction. The P-frame is an image coded using forward prediction. The B-frame is an image coded using one of forward prediction, backward prediction, and bi-directional prediction. The I-frame, the P-frame, the B-frame are compressed images already in practical use. Therefore, a detailed description for the I-frame, the P-frame, the B-frame will be omitted. The I-frame, P-frame, and B-frame are also referred to irrespectively or correctively as "compressed image".

Each of the communication devices 30, 71, 72, 73, 74, and 75 transmits its own identification ("ID") information as sender-device's ID information, and a conference ID that identifies a remote conference in which each of the communication devices 30, 71, 72, 73, 74, and 75 participates, along with video data and audio data. The server 20 transmits the sender-device's ID information and the conference ID to each destination device along with the video data and audio data received from the sender device. The ID information and conference ID are included in, for example, each header portion of the video data and the audio data. Each ID information is information for identifying particular communication devices from one another. For example, the ID information of the communication device 30 is information for identifying the communication device 30. The ID information of each of the communication devices 71, 72, 73, 74, and 75 is information for identifying each of the communication devices 71, 72, 73, 74, and 75 from one another. In the illustrative embodiment, it is assumed that all the communication devices 30, 71, 72, 73, 74, and 75 participate in the same remote conference that is identified by a predetermined conference ID.

The communication device 30 obtains (e.g., receives) video data, audio data, the ID information, and the conference ID transmitted from each of the communication devices 71, 72, 73, 74, and 75. In the communication device 30, captured images are reproduced from the respective video data received from the communication devices 71, 72, 73, 74, and 75, respectively. In other words, the communication device 30 generates captured images 381, 382, 383, 384, and 385 corresponding to the respective video data. The communication device 30 also reproduces a captured image from video data that it obtains. In other words, the communication device 30 generates a captured image corresponding to the obtained video data. The reproduction of a captured image may be performed, for example, by decoding a compressed image included in video data.

The captured image 381 corresponds to video data transmitted from the communication device 71. The captured image 382 corresponds to video data transmitted from the communication device 72. The captured image 383 corresponds to video data transmitted from the communication device 73. The captured image 384 corresponds to video data transmitted from the communication device 74. The captured image 385 corresponds to video data transmitted from the communication device 75.

The generated captured images 381, 382, 383, 384, and 385 and the captured image of the communication device 30 are laid out in accordance with a layout setting. A predetermined program for remote conference includes the layout setting. The predetermined program for remote conference may be, for example, a program for receiving processing of FIG. 10 (refer to step S77 in FIG. 10). The layout setting may be, for example, information in which an entire area, including a partial area where one or more captured images including the captured images 381, 382, 383, 384, and 385 are laid out, is patterned. In the communication device 30, the layout of the captured images 381, 382, 383, 384, and 385 and the captured image of the communication device 30 may be determined arbitrarily in advance. In the communication device 30, one of the options "display" and "hide" may be set to each captured image. For example, when the option of "hide" is set to the captured image of the communication device 30, the captured image of the communication device 30 is hidden. In the communication device 30, a remote conference screen, which includes contents thereon in accordance with the layout setting and the setting of one of the options of "display" and "hide", is displayed (refer to FIG. 2).

In the illustrative embodiment, according to the layout setting, for example, the option of "hide" is set to the captured image of the communication device 30 and the option of "display" is set to each of the captured images 381, 382, 383, 384, and 385. The captured images 381, 382, 383, 384, and 385 are aligned in the horizontal direction (refer to FIG. 2). The entire area in which the captured images 381, 382, 383, 384, and 385 are arranged in accordance with the layout setting is referred to as "video layout region A". The captured image 381 is arranged in an area A1 of the video layout region A. The captured image 382 is arranged in an area A2 of the video layout region A. The captured image 383 is arranged in an area A3 of the video layout region A. The captured image 384 is arranged in an area A4 of the video layout region A. The captured image 385 is arranged in an area A5 of the video layout region A. The video layout region A includes one column by five rows. The area A1 is an area in the "first column and first row" of the video layout region A. The area A2 is an area in the "first column and second row" of the video layout region A. The area A3 is an area in the "first column and third row" of the video layout region A. The area A4 is an area in the "first column and fourth row" of the video layout region A. The area A5 is an area in the "first column and fifth row" of the video layout region A. In other embodiments, for example, the video layout region A may include a plurality of columns.

The communication device 30 stores a status table therein (refer to FIG. 3). Status information on the captured image 381 is stored in the status table in association with the ID information of the communication device 71. Status information on the captured image 382 is stored in the status table in association with the ID information of the communication device 72. Status information on the captured image 383 is stored in the status table in association with the ID information of the communication device 73. Status information on the captured image 384 is stored in the status table in association with the ID information of the communication device 74. Status information on the captured image 385 is stored in the status table in association with the ID information of the communication device 75. Each status information includes information relating to a display condition of a corresponding one of the captured images 381, 382, 383, 384, and 385. Each status information includes information representing the position of a corresponding one of the captured images 381, 382, 383, 384, and 385 (hereinafter, referred to as "position information"). In an example depicted in FIG. 3, values "0", "1" and "2" are defined for the position information. The details of the values "0", "1" and "2" will be described later. Each status information further includes a total video play time of a corresponding one of the captured images 381, 382, 383, 384, and 385. The total video play time indicates a total display duration of each of the captured images 381, 382, 383, 384, and 385 in a video display region B during a remote conference. In the communication device 30, the duration for which each of the captured images 381, 382, 383, 384, and 385 is displayed is measured and accumulated to obtain the total display duration.

In FIG. 3, ID information "71" indicates the ID information of the communication device 71. ID information "72" indicates the ID information of the communication device 72. ID information "73" indicates the ID information of the communication device 73. ID information "74" indicates the ID information of the communication device 74. ID information "75" indicates the ID information of the communication device 75. The details relating to the display of the captured images 381, 382, 383, 384, and 385 that are laid out in accordance with the layout setting will be further described later.

In each of the communication devices 71, 72, 73, 74, and 75, captured images are also reproduced from respective video data received from the communication devices 30, 71, 72, 73, 74, and 75 other than itself, respectively. In other words, each of the communication devices 71, 72, 73, 74, and 75 generates captured images corresponding to the respective video data. In each of the communication devices 71, 72, 73, 74, and 75, a remote conference screen, which includes contents thereon in accordance with the layout setting and the setting of one of the options of "display" and "hide", is displayed. The communication devices 71, 72, 73, 74, and 75 are also configured to reproduce a captured image from video data obtained by itself and display the generated captured image thereon. Further, in each of the communication devices 71, 72, 73, 74, and 75, audio is reproduced from audio data received from each of the communication devices 30, 71, 72, 73, 74, and 75 other than itself and the generated audio corresponding to each audio data is outputted.

In the illustrative embodiment, similar to the setting for the communication device 30, in the setting for the communication devices 71, 72, 73, 74, and 75, the option of "hide" is set to own captured image generated by itself and the option of "display" is set to the captured images of the other communication devices. When a description is made from the viewpoint of a device that obtains predetermined data, the "sender device" or "sender" of the predetermined data in the illustrative embodiment is also referred to as "supplier device" or "supplier" of the predetermined data.

<Server>

As depicted in FIG. 1, the server 20 includes a central processing unit ("CPU") 22, a storage device 24, a random-access memory ("RAM") 26, a timer 27, and a communication unit 28. The CPU 22, the storage device 24, the RAM 26, the timer 27, and the communication unit 28 are connected to a bus 29.

The CPU 22 is configured to execute calculation processing. The storage device 24 may be implemented by a computer-readable storage medium, e.g., a hard disk. In other embodiments, for example, the storage device 24 may be implemented by a flash memory and/or a read-only memory ("ROM"). The storage device 24 stores therein various programs, for example, an operating system ("OS") and various applications. The applications stored in the storage device 24 include programs for executing various processing (refer to FIGS. 8, 9, 10, 15 and 16). The programs for executing the above processing are preinstalled in the storage device 24.

The pre-installation of the execution programs is implemented by which a reading unit (not depicted) of the server 20 reads the programs from a computer-readable storage medium, e.g., a semiconductor memory. In other embodiments, for example, when the server 20 includes an optical drive (not depicted), such a pre-installation may be implemented by which the optical drive reads the programs from an optical medium. In still other embodiments, for example, the pre-installation may be implemented by which the server 20 receives, via the communication unit 28 of the server 20, the programs stored in a computer-readable storage medium, e.g., a hard disk, of another server, as transmission signals. The other server may be different from the server 20 connected to the network 90. The computer-readable storage medium may include a non-transitory storage medium but not include a transitory storage medium. The non-transitory storage medium may include any storage medium that is capable of storing information regardless of storage duration of information.

The RAM 26 is a storage area to be used when the CPU 22 executes various programs. The RAM 26 stores, in a predetermined storage area, predetermined data and information used in various processing during execution of the various processing.

The CPU 22 is configured to control the server 20, for example, by executing the OS and the programs for executing the processing depicted in FIGS. 8, 9, 10, 15 and 16 stored in the storage device 24, whereby various processing are executed and various functions are implemented in the server 20.

The timer 27 has, for example, a calendar function and a clock function. The timer 27 is configured to measure elapsed time. In other embodiments, for example, the timer 27 may be implemented by a clock function of the OS. The communication unit 28 is configured to connect the server 20 to the network 90 and perform data communication via the network 90. The server 20 is configured to receive video data, audio data, and a particular conference ID from each communication device that participates in a remote conference identified by the particular conference ID. The server 20 is further configured to transmit the received video data and audio data to each destination device. For example, the communication unit 28 receives video data and audio data transmitted from each of the communication devices 30, 71, 72, 73, 74, and 75 and transmits the received video data and audio data to each destination device. In other words, the video data and audio data transmitted from each of the communication devices 30, 71, 72, 73, 74, and 75 are transferred to each destination device via the communication unit 28. The server 20 is hardwired to the network 90 via the communication unit 28. In other embodiments, for example, the server 20 may be wirelessly connected to the network 90 via the communication unit 28.

The server 20 is different from a known server in a point that the storage device 24 of the server 20 stores the programs for executing the processing depicted in FIGS. 8, 9, 10, 15 and 16. The server 20 may be an information processing device having a communication function that is the same as the known server in terms of hardware configuration. In other embodiments, for example, the server 20 may have a configuration that is the same as the known server.

<Communication Device>

As depicted in FIG. 1, the communication device 30 includes a CPU 32, a storage device 34, a RAM 36, a display 38, an operation unit 40, a camera 46, an audio unit 48, a timer 52, and a communication unit 54. The CPU 32, the storage device 34, the RAM 36, the display 38, the operation unit 40, the camera 46, the audio unit 48, the timer 52, and the communication unit 54 are connected to a bus 56.

The CPU 32 executes calculation processing. The storage device 34 may be implemented by a computer-readable storage medium, e.g., a flash memory. In other embodiments, for example, the storage device 34 may be implemented by a hard disk and/or a ROM. The storage device 34 stores various therein various programs, for example, an OS and various applications. The applications stored in the storage device 34 include programs for executing various processing (refer to FIGS. 4 and 7, 8, 9, and 10). The programs for executing the above processing may be preinstalled in the storage device 34. In other embodiments, for example, the programs may be transmitted to the communication device 30 from the server 20 via the network 90 as transmission signals when the communication device 30 accesses the server 20 for participating in a remote conference. In this case, the programs are installed in the storage device 34 or the RAM 36 of the communication device 30 upon participation of the remote conference.

The pre-installation of the execution programs is implemented by which a reading unit (not depicted) of the communication device 30 reads the programs from a computer-readable storage medium, e.g., a semiconductor memory. In other embodiments, for example, when the communication device 30 includes an optical drive (not depicted), such a pre-installation may be implemented by which the optical drive reads the programs from an optical medium. In still other embodiments, for example, the pre-installation may be implemented by which the communication device 30 receives, via the communication unit 54 of the communication device 30, the programs stored in a computer-readable storage medium, e.g., a hard disk, of another server, as transmission signals. The other server may be different from the server 20 connected to the network 90. The computer-readable storage medium may include a non-transitory storage medium but not include a transitory storage medium. The non-transitory storage medium may include any storage medium that is capable of storing information regardless of storage duration of information.

The RAM 36 is a storage area to be used when the CPU 32 executes various programs. The RAM 36 stores, in a predetermined storage area, predetermined data and information used in various processing during execution of the various processing. The RAM 36 also stores the status table (refer to FIG. 3) therein.

The CPU 32 is configured to control the communication device 30, for example, by executing the OS and the programs for executing the processing depicted in FIGS. 4, 5, 6, and 7 stored in the storage device 34, whereby various processing are executed and various functions are implemented in the communication device 30.

The display 38 is configured to display various information thereon. For example, the display 38 displays a remote conference screen including the captured images 381, 382, 383, 384, and 385 (refer to FIG. 2). The operation unit 40 is configured to receive an input, e.g., various instructions with respect to the communication device 30. The operation unit 40 includes, for example, a physical button 42 and a touch pad 44. The touch pad 44 may be, for example, a capacitive pointing device that is configured to output a signal indicating a position of a coordinate corresponding to a position where a finger of a user touches. In other embodiments, for example, the touch pad 44 may be a resistive pointing device or an ultrasonic pointing device. The display 38 and the touch pad 44 (enclosed with a dashed line in FIG. 1) constitute a touch panel.

A user of the communication device 30 performs operations, e.g., scrolling, swiping, flicking, tapping, dragging, pinch-in and/or pinch-out, on the touch pad 44. For example, the user of the communication device 30 moves a finger touching the touch pad 44 in a predetermined direction, to perform such operations. In response to the user's operations, predetermined signals are outputted from the touch pad 44. Operation information (e.g., types of operations and movement distance) corresponding to each operation is generated based on the predetermined signals. Processing to generate the operation information is employed in known smartphones or known tablet terminals as Application Programming Interface ("API") and also employed in the communication device 30. In other embodiments, for example, the operation unit 40 may further include a keyboard and a mouse. When the communication device 30 is a personal computer, the operation unit 40 includes a keyboard and a mouse.

The display of the captured images 381, 382, 383, 384, and 385 on the display 38 will be described referring to FIG. 2. The display 38 includes a display area. The video layout region A is an imaginary area that is defined beyond the display area of the display 38. The video display region B is a display area for remote conference that is defined within the display area of the display 38. In a case where an entire portion of the display area of the display 38 is defined as the display area for remote conference, the video display region B coincides with the display area of the display 38. In the illustrative embodiment, it is assumed that the entire portion of the display area of the display 38 is defined as the display area for remote conference. In FIG. 2, a "halftone area" of the display 38 indicates the display area of the display 38. The captured images 381, 382, 383, 384, and 385 are laid out in the video layout region A. A width WA of the video layout region A in the horizontal direction is greater than a width WB of the video display region B. A portion of the video layout region A is displayed in the video display region B. In other words, one or more, but not all, of the captured images 381, 382, 383, 384, and 385 are displayed in the video display region B at one time. In an example depicted in FIG. 2, particular two of the captured images 381, 382, 383, 384, and 385 are displayed in the video display region B at one time.

For example, in order to change the display contents on the display area of the display 38 from the captured images 381 and 382 (refer to an upper drawing in FIG. 2) to the captured images 384 and 385 (refer to a lower drawing in FIG. 2), a user of the communication device 30 performs a swiping operation to move a finger touching the touch pad 44 from the right to the left. In response to this, the video layout region A moves relative to the video display region B in the horizontal direction and thus the captured images 384 and 385 are displayed. In the communication device 30, with reference to the horizontal direction, particular areas of the video layout region A displayed in the video display region B are identified.

The position information to be stored in the status table (refer to FIG. 3) will be described. The value "0" of the position information indicates that a particular area of the video layout region A in which a captured image corresponding to target ID information is arranged is positioned within the video display region B. In other words, the value "0" of the position information indicates that the captured image corresponding to the target ID information is being displayed. Both the values "1" and "2" of the position information indicate that a particular area of the video layout region A, in which a captured image corresponding to target ID information is arranged, is not positioned within the video display region B. In other words, the values "1" and "2" of the position information indicate that the captured image corresponding to the target ID information is being hidden. The value "1" of the position information indicates that a particular area of the video layout region A, in which a hidden captured image is positioned, within an area corresponding to a reference distance WC with reference to a reference edge in a direction opposite to a moving direction. That is, when the position information indicates the value "1", the particular area in which the hidden captured image is arranged is positioned within the area corresponding the reference distance WC with reference of the reference edge of the video display region B. The value "2" of the position information indicates that a particular area of the video layout region A in which a hidden captured image is arranged is positioned out of the area corresponding to the reference distance WC with reference to the reference edge in the direction opposite to the moving direction. That is, when the position information indicates the value "2", the particular area in which the hidden captured image is arranged is positioned out of the area corresponding to the reference distance WC with respect to the reference edge of the video display region B.

The moving direction of the captured images in response to a swiping operation for displaying one or more hidden captured images is the horizontal direction. In an upper drawing of FIG. 2, the hidden captured images may be, for example, the captured images 383, 384, and 385. In a lower drawing of FIG. 2, the hidden captured images may be, for example, the captured images 381, 382, and 383. The reference edge may be a trailing edge of both edges of the video display region B in the horizontal movement. For example, in the example depicted in the upper drawing of FIG. 2, the right edge of the video display region B in the horizontal direction may be the reference edge. In the example depicted in the lower drawing of FIG. 2, the left edge of the video display region B in the horizontal direction may be the reference edge. The reference distance WC is a distance appropriate for a distance WD. The distance WD is a distance between edges on the same side (e.g., the right edges or the left edges) of adjacent two of the captured images in the horizontal direction. In the illustrative embodiment, particular two of a plurality of captured images are displayed in the video display region B at the same time (refer to FIG. 2). Therefore, the reference distance WC is twice as long as the distance WD. In other embodiments, for example, the reference distance WC may be the same as the distance WD or three times or more as long as the distance WD.

Figure 2:
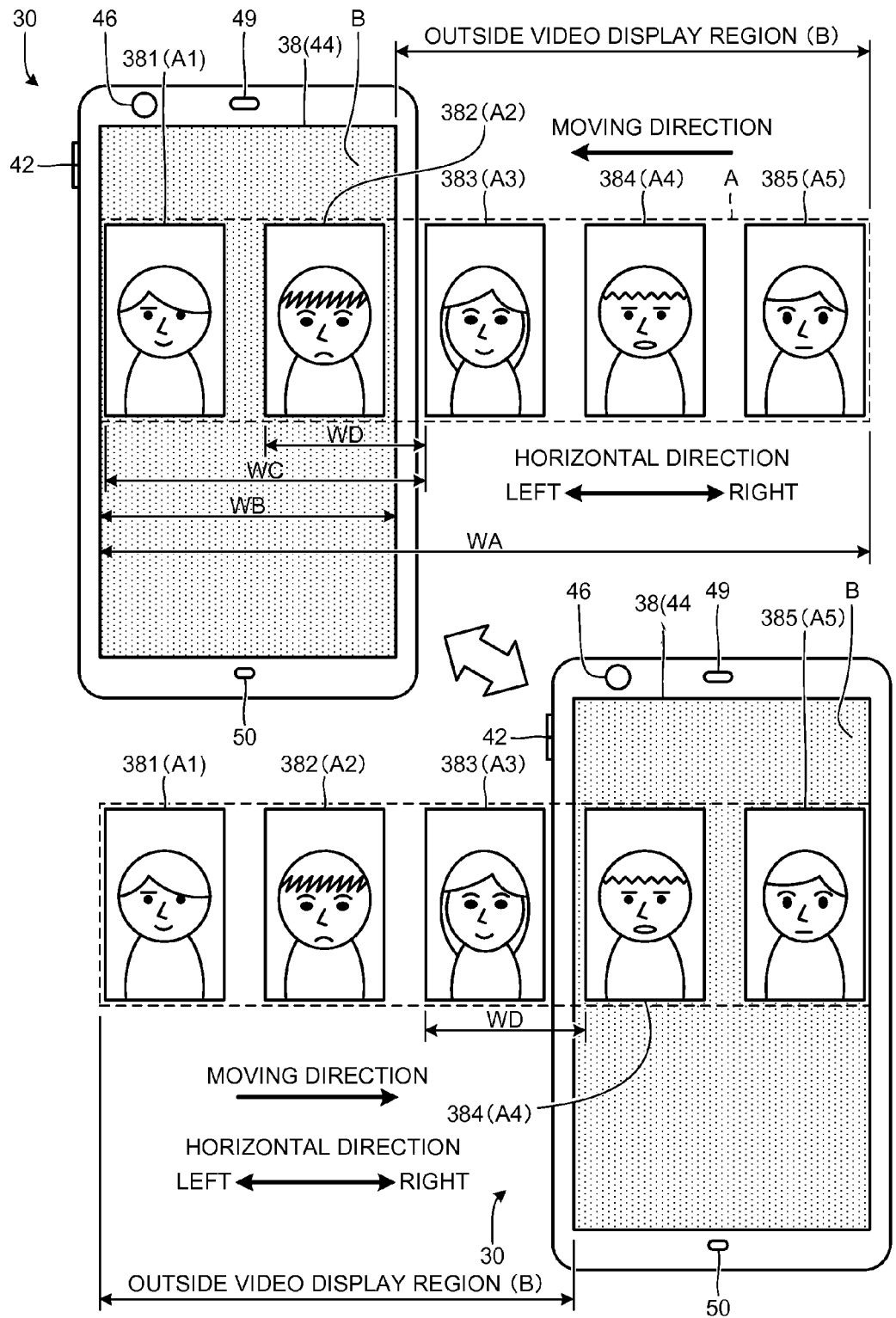
FIG. 2 illustrates a relationship between a video layout region in which one or more captured images are laid out and a video display region of a display in the illustrative embodiment according to one or more aspects of the disclosure.

For example, in the example depicted in the upper drawing of FIG. 2, the areas A1 and A2 that are positioned within the video display region B are identified, and the areas A3, A4, and A5 that are positioned out of the video display region B are identified. Further, the areas A3 and A4 that are positioned within the area corresponding to the reference distance WC with reference to the reference edge are identified among the areas A3, A4, and A5, and the area A5 that is positioned out of the area corresponding to the reference distance WC with reference to the reference edge is identified. In the communication device 30, based on such identification of the particular areas, appropriate values are stored in the status table. In the illustrative embodiment, for example, the value "0" is stored as the position information in the status table with being associated with each of the sender's ID information "71" and "72" corresponding to the captured images 381 and 382 arranged in the areas A1 and A2 (refer to FIG. 3). The value "1" is stored as the position information in the status table with being associated with each of the sender's ID information "73" and "74" corresponding to the captured images 383 and 384 arranged in the areas A3 and A4 (refer to FIG. 3). The value "2" is stored as the position information in the status table with being associated with the sender's the ID information "75" corresponding to the captured image 385 arranged in the area A5 (refer to FIG. 3).

In the example depicted in the lower drawing of FIG. 2, the areas A4 and A5 that are positioned within the video display region B are identified, and the areas A1, A2, and A3 that are positioned out of the video display region B are identified. Further, the areas A2 and A3 that are positioned within the area corresponding to the reference distance WC with reference to the reference edge are identified among the areas A1, A2, and A3, and the area A1 that is positioned out of the area corresponding to the reference distance WC with reference to the reference edge is identified. In this case, the value "0" is stored as the position information in the status table with being associated with each of the ID information "74" and "75". The value "1" is stored as the position information in the status table with being associated with each of the ID information "72" and "73". The value "2" is stored as the position information in the status table with being associated with the ID information "71"

The camera 46 is configured to capture an external image that presents in a predetermined direction with respect to the communication device 30 (e.g., in front of the communication device 30). For example, when there is a user of the communication device 30 in front of the communication device 30, the camera 46 captures an external image including the user. The audio unit 48 includes a speaker 49 and a microphone 50. The speaker 49 is configured to output audio. The microphone 50 is configured to collect external audio. For example, the microphone 50 collects voice outputted by the user of the communication device 30. The audio unit 48 is configured to output audio corresponding to audio data from the speaker 49. The audio unit 48 is configured to generate waveform data through analog-to-digital conversion of audio collected by the microphone 50 using a predetermined sampling frequency (e.g., 11.025 kHz or 44.1 kHz). The communication device 30 is configured to start capturing an external image using the camera 46 and collecting external audio using the microphone 50 upon start of a remote conference. In the communication device 30, video data corresponding to a captured image and audio data corresponding to the generated waveform data are generated.

The timer 52 has, for example, a calendar function and a clock function. The timer 52 is configured to measure elapsed time. In other embodiments, for example, the timer 52 may be implemented by a clock function of the OS. The communication unit 54 is configured to connect the communication device 30 to the network 90 and perform data communication via the network 90. For example, the communication unit 54 of the communication device 30 transmits video data and audio data, which are generated during a remote conference, to the server 20, along with the ID information of the communication device 30 and the conference ID identifying the remote conference in which the communication device 30 participates. Then, the server 20 further transmits the received video data, audio data, and ID information of the communication device 30 to each of the communication devices 71, 72, 73, 74, and 75 that participate in the remote conference identified by the same conference ID. The communication unit 54 of the communication unit 30 receives video data, audio data, and the sender-device's ID information transmitted from each of the communication devices 71, 72, 73, 74, and 75 via the server 20. The communication device 30 is wired or wirelessly connected to the network 90 communication unit 54. For example, when the communication device 30 is a mobile device, the communication device 30 is wirelessly connected to the network 90 via the communication unit 54. The communication unit 54 is a communication module for performing wireless communication in compliance with a known communication standard, for example, a Wi-Fi standard, a 4G standard, or a 3G standard.

The communication device 30 is different from a known mobile device in a point that the storage device 34 of the communication device 30 stores the programs for executing the processing depicted in FIGS. 4, 5, 6, and 7. The communication device 30 may be a communication device that is the same as a known mobile device in terms of hardware configuration.

<Processing Executed in Communication Device>

The various processing executed in the communication device 30 during a remote conference will be described. In the remote conference system 10, for example, the server 20 sends an electronic mail ("e-mail") to e-mail addresses corresponding to the communication devices 30, 71, 72, 73, 74, and 75 before a predetermined time and date of a particular remote conference. Each e-mail includes a Uniform Resource Locator ("URL") of the particular remote conference to be held among the communication devices 30, 71, 72, 73, 74, and 75. The URL is unique to each virtual conference room of a remote conference. In other words, the URL includes a conference ID of a remote conference. The conference ID may be included as, for example, a query parameter of a URL.

The user of the communication device 30 performs an appropriate operation on the communication device 30 on or after the predetermined time and date of the particular remote conference. For example, in the communication device 30, the CPU 32 accesses the server 20 via the communication unit 54 based on the URL including the conference ID of the particular remote conference, and executes processing for establishing a session for the particular remote conference with the server 20. In other embodiments, for example, the CPU 32 may allow the communication unit 54 to transmit a login request including a predetermined user ID and a password to the server 20. In this case, when a login is successful, the CPU 32 may transmit the conference ID from the communication unit 54 to the server 20 to establish a session for the particular remote conference with the server 20. Processing described below are executed while the session for the particular remote conference is established between the communication device 30 and the server 20 (e.g., while the communication device 30 is connected with a particular remote conference room for the particular remote conference).

The CPU 32 allows the timer 52 to start measuring time upon establishment of a connection of the communication device 30 to the particular remote conference room. The CPU 32 is configured to store, in the RAM 36, elapsed time from the start of measurement. In other embodiments, for example, the timer 52 may be configured to start measuring time upon establishment of connections of all the communication devices 30, 71, 72, 73, 74, and 75, which are scheduled to participate in the same remote conference identified by the same conference ID, to the particular remote conference room. Upon establishment of connections of all the communication devices 30, 71, 72, 73, 74, and 75, which are scheduled to participate in the same remote conference, to the particular remote conference room, the server 20 notifies each of the communication devices 30, 71, 72, 73, 74, and 75 that all the communication devices 30, 71, 72, 73, 74, and 75 have connected to the particular remote conference room.

<Audio Data Transmitting Processing>

Audio Data transmitting processing will be described referring to FIG. 4. The audio data transmitting processing is repeatedly executed at regular intervals until the communication device 30 is disconnected from the particular conference room after establishing the connection thereto. The audio data transmitting processing is repeatedly executed, for example, at predetermined encoding intervals (e.g., at intervals of 20 msec.). The play duration of 20 msec. of audio data corresponds to the encoding intervals of 20 msec. Subsequent to starting the audio data transmitting processing, the CPU 32 obtains audio collected using the microphone 50 (e.g., step S11). The audio obtained by the CPU 32 in step S11 includes waveform data generated through the analog-to-digital conversion of audio collected by the microphone 50 using the predetermined sampling frequency (e.g., 11.025 kHz or 44.1 kHz). The CPU 32 determines volume (dB) of the collected audio and judges whether the value representing the determined volume of the collected audio is greater than a threshold value (e.g., step S13). For example, the volume may be determined by determination of a level of the waveform of the audio obtained in step S11. The audio collected in step S11 includes a plurality of sampling points. Therefore, for example, an average level of a plurality of sampling points included in a predetermined time period may be determined as volume of audio. In other embodiments, for example, a maximum level of a plurality of sampling points included in the predetermined time period may be determined as volume of audio. The threshold value, which is the reference to be used in step S13, is predetermined in consideration given to volume of user's voice such that the CPU 32 determines that the user of the communication device 30 outputs voice in a remote conference. The threshold value is stored in the storage device 34 with being associated with the program for executing audio data transmitting processing. In other embodiments, for example, the threshold value may be changed in response to degree of background noises.

When the value representing the determined volume of audio is greater than the threshold value (e.g., YES in step S 13), the CPU 32 generates compressed audio data by encoding the obtained audio using a predetermined compression method, e.g., MPEG-4 AAC or G.711 (e.g., step S15). The audio data may be a packet that includes, for example, encoded data corresponding waveform data having a play duration of 20 msec. The CPU 32 assigns the ID information of the communication device 30 to the generated audio data (e.g., step S17). Subsequently, the CPU 32 controls transmission of the audio data assigned with the ID information (e.g., step S19). In step S19, the CPU 32 outputs, to the communication unit 54, an instruction to transmit the audio data. Thus, the audio data is transmitted from the communication unit 54 to the server 20. When the value representing the determined volume of audio is smaller than or equal to the threshold value (e.g., NO in step S13), or subsequent to step S19, the CPU 32 ends the audio data transmitting processing.

<Video Data Transmitting Processing>

Figure 5:
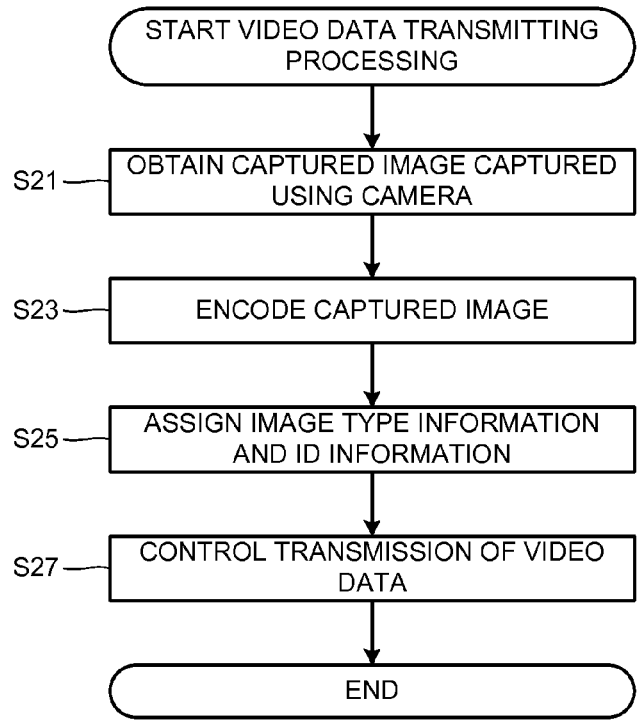
FIG. 5 is a flowchart depicting example video data transmitting processing in the illustrative embodiment according to one or more aspects of the disclosure.

Video data transmitting processing will be described referring to FIG. 5. The video data transmitting processing is repeatedly executed at regular intervals until the communication device 30 is disconnected from the particular conference room after establishing the connection thereto. The video data transmitting processing is repeatedly executed at intervals corresponding to the frame rate of video data. For example, when the frame rate is 30 fps, the video data transmitting processing is executed at intervals of ⅓₀ sec. Subsequent to starting the video data transmitting processing, the CPU 32 obtains a captured image captured using the camera 46 (e.g., step S21). Subsequently, the CPU 32 generates a compressed image by encoding the captured image using a predetermined compression method, e.g., the H.264 video compression method (e.g., step S23).

The CPU 32 assigns image type information and the ID information of the communication device 30 to video data including the generated compressed image (e.g., step S25). The image type information indicates a type of the generated compressed image. For example, when the generated compressed image is an I-frame, the video data is assigned with the image type information indicating I-frame. When the generated compressed image is a P-frame, the video data is assigned with the image type information indicating P-frame. When the generated compressed image is a B-frame, the video data is assigned with the image type information indicating B-frame.

The CPU 32 controls transmission of the video data including the compressed image. The vide data is assigned with the ID information of the communication device 30 and the image type information (e.g., step S27). In step S27, the CPU 32 outputs, to the communication unit 54, an instruction to transmit the video data. Thus, the video data is transmitted from the communication unit 54 to the server 20. Subsequent to step S27, the CPU 32 ends the video data transmitting processing.

<Receiving Processing>

Figure 6:
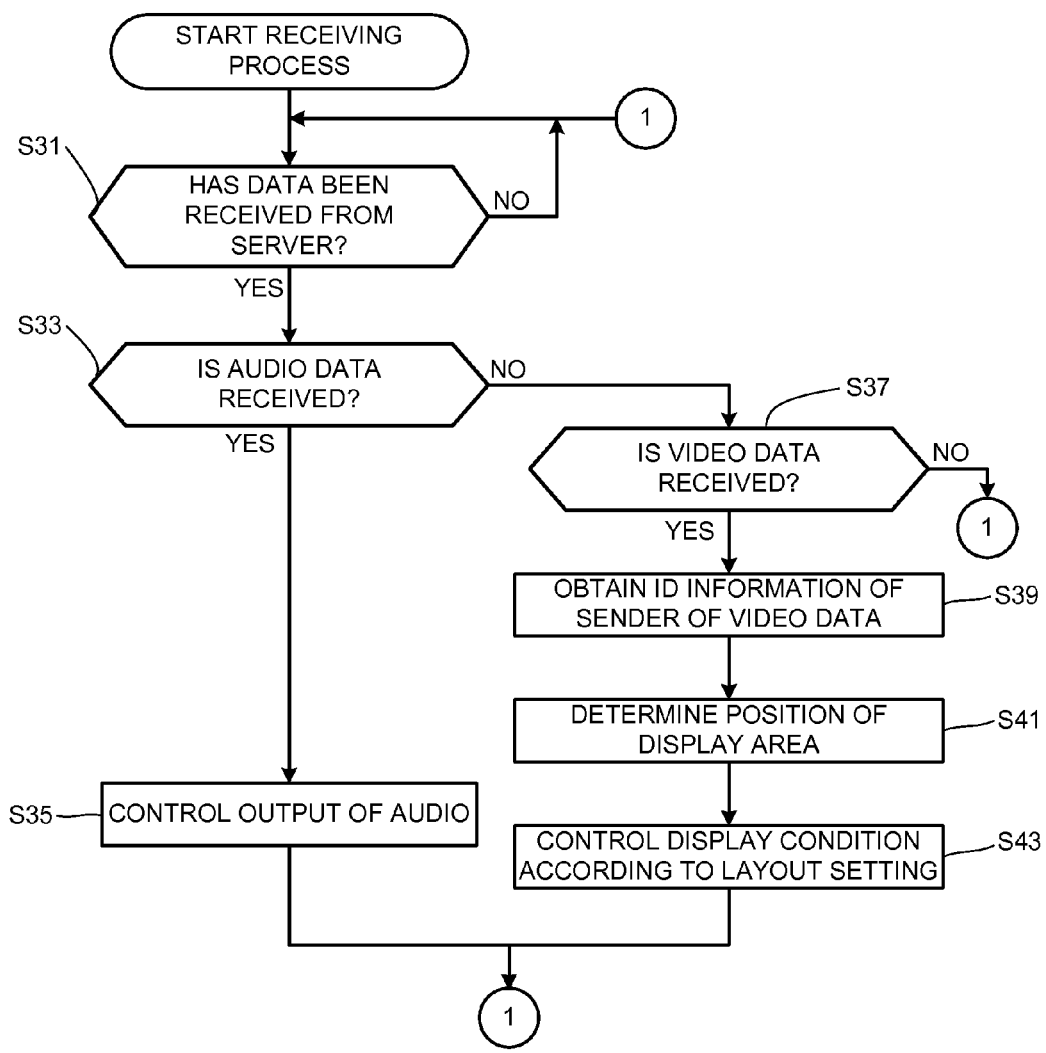
FIG. 6 is a flowchart depicting an example receiving processing in the illustrative embodiment according to one or more aspects of the disclosure.

Receiving processing will be described referring to FIG. 6. The receiving processing is repeatedly executed at regular intervals until the communication device 30 is disconnected from the particular conference room after establishing the connection thereto. Subsequent to starting the receiving processing, the CPU 32 judges whether the predetermined data transmitted from the server 20 has been obtained (e.g., received via the communication unit 54) (e.g., step S31). When the CPU 32 judges that the predetermined data has not been obtained yet (e.g., NO in step S31), the CPU 32 repeatedly executes this judgment step.

When the CPU 32 judges that the predetermined data has received (e.g., YES in step S31), the CPU 32 judges whether the received data is audio data (e.g., step S33). When the CPU 32 judges that the received data is audio data (e.g., YES in step 33), the CPU 32 controls output of audio corresponding to the obtained audio data (e.g., step S35). In step S35, the CPU 32 reproduces audio from the obtained audio data (e.g., decodes the received audio data) and outputs, to the audio unit 48, an instruction to output the reproduced audio. In response to the output instruction, the audio unit 48 outputs audio corresponding to the audio data through the speaker 49. When audio data transmitted from the communication device 71 has been received while the display 38 is in a state depicted in the upper drawing of FIG. 2, audio including voice of a user of the communication device 71 is outputted through the speaker 49. When audio data transmitted from the communication device 74 has been received while the display 38 is in a state depicted in the upper drawing of FIG. 2, audio including voice of a user of the communication device 74 is outputted through the speaker 49. In other words, in the communication device 30, audio corresponding to each audio data received from each of the communication devices 71, 72, 73, 74, and 75 is outputted through the speaker 49 regardless of whether the captured images 381, 382, 383, 384, and 385 of the communication devices 71, 72, 73, 74, and 75 are displayed or hidden. Subsequent to step S35, the routine returns to step S31 and the CPU 32 executes step S31 and subsequent steps again.

When the received data is not audio data (e.g., NO in step S33), the CPU 32 judges whether the received data is video data (e.g., step S37). When the received data is not video data (e.g., NO in step S37), the CPU 32 executes processing appropriate for the received data as necessary. Subsequently, the routine returns to step S31 and the CPU 32 executes step S31 and subsequent steps again.

When the received data is audio data (e.g., YES in step S37), the CPU 32 obtains the ID information of the communication device that is a sender of the video data (e.g., step S39). For example, when the received data is video data transmitted from the communication device 71, the CPU 32 obtains the ID information of the communication device 71 assigned to the video data. When the received data is video data transmitted from the communication device 75, the CPU 32 obtains the ID information of the communication device 75.

The CPU 32 determines a position of the display area for the received video data in the video layout region A (e.g., step S41). In one example, it is assumed that audio data transmitted from the communication device 71 has been received while the display 38 is in the state depicted in the upper drawing of FIG. 2. In step S41, as a first step, the CPU 32 identifies the areas A1 and A2 that positioned within the video display region B. As a second step, the CPU 32 identifies the area A1 in which the captured image 381 corresponding to video data transmitted from the communication device 71 is arranged in the video layout region A, based on the layout setting. In the communication device 30, each of the areas A1, A2, A3, A4, and A5 included in the video layout region A is stored with being associated with corresponding ID information. Based on the ID information obtained in step S39, the CPU 32 identifies a particular area of the video layout region A arranged in accordance with the layout setting. Then, the CPU 32 determines whether the particular area is identified in both the first and second steps. In this case, the area A1 is identified in both the first and second steps. Therefore, the CPU 32 determines that the area A1 is positioned within the video display region B.

In another example, it is assumed that video data transmitted from the communication device 75 has been received while the display 38 is in the state depicted in the upper drawing of FIG. 2. In this case, in step S41, as a first step, the CPU 32 identifies the areas A1 and A2 that positioned within the video display region B. As a second step, the CPU 32 identifies the area A5 in which the captured image 385 corresponding to video data transmitted from the communication device 75 is arranged in the video layout region A, based on the layout setting. In this case, the area A5 is not identified in both the first and second steps. Therefore, the CPU 32 determines that the area A5 is positioned out of the video display region B.

Subsequently, the CPU 32 controls the display condition according to the layout setting (e.g., step S43). During this control, the CPU 32 executes processing based on the determination result made in step S43. For example, when the received data is video data transmitted from the communication device 71, the CPU 32 controls the display condition of the captured image 381 based on the determination result that the received video data is positioned within the video display region B. The CPU 32 reproduces video based on the video data transmitted from the communication device 71 and obtains the captured image 381. Subsequently, the CPU 32 outputs, to the display 38, an instruction to output the captured image 381. In response to the output instruction, the display 38 displays the captured image 381 newly obtained, in the area A1. Subsequent to step S43, the routine returns to step S31 and the CPU 32 executes step S31 and subsequent steps.

When the determination result made in step S41 indicates that the received video data is positioned out of the video display region B, the routine skip step S43. For example, when the received data is video data transmitted from communication device 75, the CPU 32 does not execute the control of the display condition of the captured image 385 corresponding to video data transmitted from the communication device 75. Subsequent to step S41, the routine skips step S43 and returns to step S31.

<Layout Information Transmitting Processing>

Layout information transmitting processing will be described referring to FIG. 7. The layout information transmitting processing is repeatedly executed at regular intervals until the communication device 30 is disconnected from the particular conference room after establishing the connection thereto and displaying a remote conference screen (refer to FIG. 2) including one or more of the captured images 381, 382, 383, 384, and 385 in response to step S43 of FIG. 6. The layout information transmitting processing is executed, at every predetermined interval, e.g., 100 msec. Subsequent to starting the layout information transmitting processing, the CPU 32 specifies a positional relationship between the video layout region A and the video display region B (e.g., step S51). For example, the CPU 32 identifies particular two areas of the video layout region A positioned within the video display region B and the other areas of the video layout region A positioned out of the video display region B. In the case depicted in the upper drawing of FIG. 2, the CPU 32 identifies the areas A1 and A2 of the video layout region A that are positioned within the video display region B and the areas A3, A4, and A5 of the video layout region A that are positioned out of the video display region B.

Subsequently, the CPU 32 generates layout information (e.g., step S53). At the generation of the layout information, the CPU 32 updates each information stored in the status table (refer to FIG. 3). The CPU 32 identifies the ID information associated with each of the particular areas, among the areas that are arranged in the video layout region A in accordance with the layout setting. The particular areas have been identified in step S51 as such that the particular areas are positioned within the video display region B. Then, the CPU 32 designates the value "0" as the position information in association with the identified ID information. The CPU 32 further identifies one or more particular areas positioned within the area corresponding to the reference distance WC and one or more other particular areas positioned out of the area corresponding to the reference distance WC, among the areas that are arranged in the video layout region A in accordance with the layout setting and have been identified in step S51 as such that the areas are positioned out of the video display region B. Then, the CPU 32 identifies the ID information associated with each of the particular areas positioned within the area corresponding to the reference distance WC and the ID information associated with each of the particular areas positioned out of the area corresponding to the reference distance WC. Then, the CPU 32 designates the value "1" as the position information in association with the ID information identifying the area positioned within the area corresponding to the reference distance WC. The CPU 32 also designates the value "2" as the position information in association with the ID information identifying the area positioned out of the area corresponding to the reference distance WC. At the generation of the layout information in step S53, the CPU 32 updates the total video play time associated with the ID information associated with the area that is identified in step S51 as the area of the video layout region A positioned within the video display region B.

For example, as described above, it is assumed that the areas A1 and A2 are identified as the areas of the video layout region A positioned within the video display region B (refer to the upper drawing of FIG. 2). In this case, the CPU 32 updates the position information in the status table as described in FIG. 3. Further, the CPU 32 adds a predetermined amount of time (e.g., 100 msec.), which is the predetermined interval, to each total video play time associated with a corresponding one of the ID information "71" and "72". The predetermined interval may be the time elapsed between a timing of the last execution of step S53 and a timing of this-time execution of step S53.

In step S53, the CPU 32 generates layout information, which corresponds to each information and the associations stored in the status table, based on the status table updated as described above. The layout information includes the status information and the ID information associated with each other. Subsequently, the CPU 32 controls transmission of the layout information and the own ID information (e.g., step S55). In S55, the CPU 32 outputs, to the communication unit 54, an instruction to transmit the layout information and the ID information of the communication device 30 to the server 20. Thus, the update frequency setting and the ID information of the communication device are transmitted from the communication unit 54 to the server 20. The ID information of the communication device 30 that is a sender may be included in, for example, a header portion of the layout information. Subsequent to step S55, the CPU 32 ends the layout information transmitting processing.

<Processing Executed in Server>

Processing executed in the server 20 during the remote conference will be described. Each processing described below is executed for one or more of the communication devices 30, 71, 72, 73, 74, and 75, which are connected to the same conference room. The CPU 22 starts measuring an elapsed time using the timer 27 at a timing at which one of the communication devices 30, 71, 72, 73, 74, and 75 connects to a particular remote conference room. The CPU 22 stores the measured time elapsed from the start of measurement in the RAM 26. In other embodiments, for example, the time measurement using the timer 27 may be started at a timing at which all of the predetermined communication devices 30, 71, 72, 73, 74, and 75, connect to a particular remote conference room for a remote conference identified by a conference ID. In description of processing executed in server 20, one or more or all of the communication devices 30, 71, 72, 73, 74, and 75 may refer to "communication device or communication devices" without reference numerals.

<Transferring Processing>

Transferring processing will be described referring to FIGS. 8, 9, and 10. The transferring processing is repeatedly executed until all of one or more of the communication devices 30, 71, 72, 73, 74, and 75 disconnect from the particular conference room after one of the one or more communication devices 30, 71, 72, 73, 74, and 75 connects to the particular conference room. Subsequent to starting the transferring processing, the CPU 22 judges whether the predetermined data transmitted from one of the communication devices 30, 71, 72, 73, 74, and 75 has been obtained (e.g., received via the communication unit 28) (e.g., step S61). When the CPU 22 judges that the predetermined data has not been received (e.g., NO in step S61), the CPU 22 executes this determination step repeatedly.

When the CPU 22 judges that the predetermined data has been received (e.g., YES in step S61), the CPU 22 judges whether the received data is layout information (e.g., step S63). When the CPU 22 judges that the received data is not layout information (e.g., NO in step S63), the routine proceeds to step S75 of FIG. 9. When the CPU 22 judges that the received data is layout information (e.g., YES in step S63), the CPU 22 stores the layout information (e.g., step S65). The layout information is stored in the RAM 26 with being associated with the ID information of the communication device that is the sender of the layout information (refer to FIG. 11). The sender-device's ID information is received by the communication unit 28 along with the layout information. The CPU 22 obtains the sender-device's ID information along with the layout information via the communication unit 28.

Figure 7:
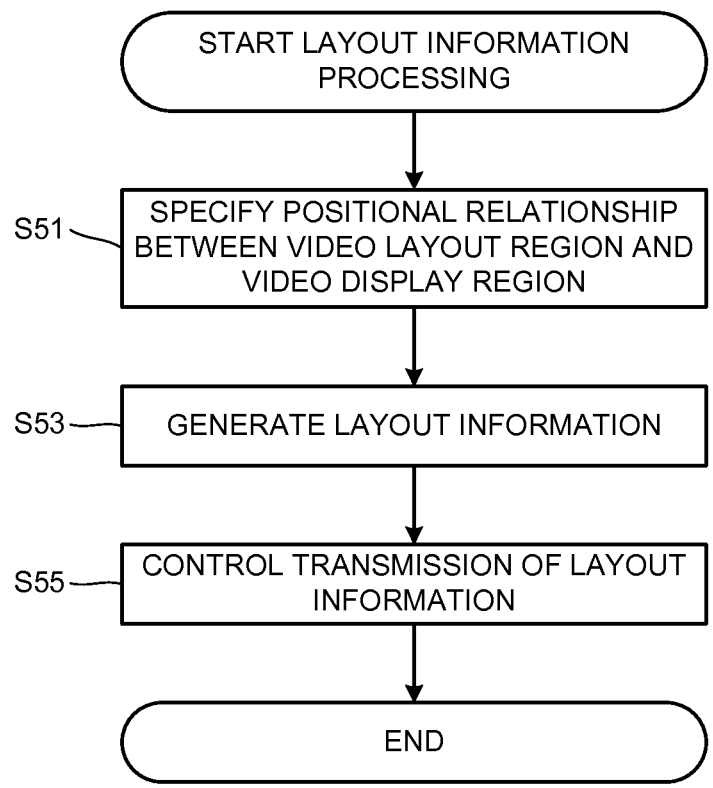
FIG. 7 is a flowchart depicting example layout information transmitting processing in the illustrative embodiment according to one or more aspects of the disclosure.

In FIG. 11, "ID information (target)" corresponds to the "ID information (target)" included in the layout information generated in step S53 of FIG. 7 based on the status table depicted in FIG. 3. In the illustrative embodiment, each communication device obtains a captured image of own device from video data obtained in itself (e.g., directly from camera 46) without the captured image passing through the server 20. Therefore, the layout information transmitted from each of the communication devices, i.e., the layout information of the sender device, might not include the status information for own device. Although the layout information transmitted from each communication device is stored in the server 20 (refer to FIG. 11), there is no layout information for the "ID information (target)" corresponding to the sender-device's ID information. The layout information of the communication device 30 is transmitted from the communication device 30 in step S55 of FIG. 7. The layout information of each of the communication devices 71, 72, 73, 74, and 75 is transmitted from each of the communication devices 71, 72, 73, 74, and 75 in a step corresponding to step S55 of FIG. 7.

Subsequently, the CPU 22 judges whether steps S69 to S73 have been executed for all of each of the communication devices identified by the "ID information (target)" included in the layout information stored in step S65 after received (e.g., step S67). The processing of steps S69 to S73 are a series of processing in which update frequency information is determined for each communication device identified by the "ID information (target)" included in the layout information stored in step S65 and the update frequency information determined for each communication device is stored in the update frequency setting associated with the ID information of the communication device that is the sender of the layout information. When the CPU 22 judges that there is no communication device on which steps S69 to S73 have not been executed yet, i.e., steps S69 to S73 have already been executed for all the communication devices (e.g., YES in step S67), the routine returns to step S61 and the CPU 22 executes the processing of S61 and subsequent steps. When the CPU 22 judges that there is one or more communication devices on which steps S69 to S73 have not been executed yet, i.e., steps S69 to S73 have not been executed for all the communication devices (e.g., NO in step S67), the CPU 22 determines one of the one or more communication devices as a target to be processed (e.g., step S69). For example, it is assumed that the layout information stored in step S65 is the layout information transmitted from the communication device 30 and steps S69 to S73 have been executed for the communication devices 71, 72, and 73 but not executed yet for the communication devices 74 and 75. In this case, one of the communication devices 74 and 75, e.g., the communication device 74, is determined as a target to be processed.

Subsequently, the CPU 22 executes the update frequency determining processing (e.g., step S71). The update frequency determining processing is executed for the communication device selected in step S69. The update frequency determining processing will be described later. The CPU 22 stores the determined update frequency information for the communication device selected in step S69 to the update frequency setting that is associated with the ID information of the sender device that transmits the layout information (e.g., step S73). The update frequency information is determined in the update frequency determining processing that is executed for the communication device selected in step S69. The sender-device's ID information is received along with the layout information. The update frequency setting is stored in the RAM 26 with being associated with the ID information of the sender device that transmits the layout information (refer to FIG. 12). Subsequent to step S73, the routine returns to step S67 and the CPU 22 executes step S67 and subsequent steps.

The update frequency information indicates whether which one or more of compressed images of various types included in video data are determined as a non-target for transmission. For example, the update frequency information is defined as described in FIG. 13. An update rule concerning the update frequency information will be described referring to FIG. 5. In the illustrative embodiment, for example, the update rule defines update frequency levels "5", "4", "3", "2", and "1" for the update frequency information. The update frequency level "5" is the highest level for the update frequency information. Subsequent to the update frequency level "5", the level becomes lower in the order of the update frequency levels "4", "3", and "2". The update frequency level "1" is the lowest level for the update frequency information.

At the update frequency level "5", for example, an I-frame, a P-frame, and a B-frame are all determined as a target for transmission. None of the I-frame, the P-frame, and the B-frame is determined as a non-target for transmission. Therefore, for video data corresponding to the update frequency level "5", I-frames, P-frames, and B-frames are all transmitted to each destination device, other than the sender device of the video data, via the server 20. Thus, this rule enables a captured image to be updated in the communication device 30 based on all of the I-frames, the P-frames, and the B-frames. A minimum I-frame transmission interval is defined as 0 msec. The minimum I-frame transmission interval indicates the shortest interval at which the server 20 transmits an I-frame which is a target for transmission.

At the update frequency level "4", for example, an I-frame and a P-frame are determined as a target for transmission and a B-frame is determined as a non-target for transmission. Therefore, for video data corresponding to the update frequency level "4", I-frames and P-frames are transmitted to each destination device, other than the sender device of the video data, via the server 20, and B-frames are not transmitted to the communication device 30. Thus, this rule enables a captured image to be updated in the communication device 30 based on the I-frames and the P-frames. The minimum I-frame transmission interval is defined as 0 msec.

At the update frequency level "3", for example, an I-frame is determined as a target for transmission and a P-frame and a B-frame are determined as a non-target for transmission. The minimum I-frame transmission interval is defined as 300 msec. Therefore, for video data corresponding to the update frequency level "3", I-frames are transmitted to each destination device, other than the sender device of the video data, via the server 20 at intervals of 300 msec. or longer, and P-frames and B-frames are not transmitted to the communication device 30. Thus, this rule enables a captured image to be updated in the communication device 30 based on the I-frames transmitted from the server 20 at intervals of 300 msec. or longer.

At the update frequency level "2", for example, an I-frame is determined as a target for transmission and a P-frame and a B-frame are determined as a non-target for transmission. The minimum I-frame transmission interval is defined as 2000 msec. Therefore, for video data corresponding to the update frequency level "2", I-frames are transmitted to each destination device, other than the sender device of the video data, via the server 20 at intervals of 2000 msec. or longer, and P-frames and B-frames are not transmitted to the communication device 30. This rule enables a captured image to be updated in the communication device 30 based on I-frames transmitted from the server 20 at intervals of 2000 msec. or longer.

At the update frequency level "1", for example, an I-frame, a P-frame, and a B-frame are all determined as a non-target for transmission. In this case, transmission of video data corresponding to the update frequency level "1" to each destination device, other than the sender device of the video data, via the server 20 is stopped. The illustrative embodiment will be described below using example cases according to the update frequency levels "5", "4", "3", "2", and "1" depicted in FIG. 13.

The processing of S73 will be described assuming that the sender of the layout information stored in step S65 is the communication device 30, the communication device 74 is selected as a target to be processed in step S69, and the update frequency level "1" is determined as the update frequency information in the update frequency determining processing of step S71. The CPU 22 stores the update frequency level "1" for the ID information "74" identifying the communication device 74 to be processed in association with the ID information "30" identifying the communication device 30 that is the sender of the layout information (refer to FIG. 12).

In FIG. 12, the "ID information (target)" corresponds to the "ID information (target)" included in the layout information. As described above, the layout information does not include the status information of the sender device. Therefore, there is no update frequency information stored for the "ID information (target)" corresponding to the sender-device's ID information with respect to the update frequency setting stored in the server 20 (refer to FIG. 12). The values indicated in the status information (e.g., the position information and the total video play time) depicted in FIG. 11 and the values indicated in the update frequency information depicted in FIG. 12 are merely arbitrary example values, and consideration might not be given to correspondences among the values in the status information and in the update frequency information.

The CPU 22 judges whether the received data is video data (e.g., step S75). When the received data is not video data (e.g., NO in step S75), the routine proceeds to step S97 of FIG. 10. When the received data is video data (e.g., YES in step S75), the CPU 22 obtains the ID information and the image type information which are assigned to the video data (e.g., step S77). The video data received from the communication device 30 is the video data transmitted from the communication device 30 in step S27 of FIG. 5. The video data of the communication devices 71, 72, 73, 74, and 75 received from the communication devices 71, 72, 73, 74, and 75 are the video data transmitted from the communication devices 71, 72, 73, 74, and 75, respectively, in a step corresponding to step S27 of FIG. 5. The CPU 22 stores the obtained ID information and compressed image information in the RAM 26.

The CPU 22 judges whether the compressed image included in the video data is I-frame (e.g., step S79). This judgment is made based on the image type information obtained in step S77. When the CPU 22 judge that the compressed image is I-frame (e.g., YES in step S79), the CPU 22 obtains bandwidth provided for the sender device of the video data (e.g., step S81). The bandwidth is calculated by dividing a total data amount of all compressed image data received between after last time reception of I-frame and before this time reception of I-frame in one communication device by a time elapsed between after last time reception of I-frame and before this time reception of I-frame.

In order to calculate the bandwidth, the CPU 22 obtains the total data amount and the elapsed time. The total data amount is obtained, for example, as described below. Once the CPU 22 obtains an I-frame from a predetermined communication device, every time the CPU 22 obtains a compressed image from the predetermined communication device, the CPU 22 adds an amount of data of the received compressed image. The adding of the amount of data is continued until the CPU 22 receives another I-frame from the predetermined communication device. When the CPU 22 newly receives an I-frame from the predetermined communication device, the CPU 22 adds the amount of data of the newly-received I-frame to an accumulated value to obtain the total data amount. The CPU 22 resets the accumulated value as the CPU 22 obtains the total data amount. Subsequent to resetting the accumulated value, the CPU 22 starts adding a data mount of a received compressed image. The elapsed time is obtained based on a difference between a timing at which the CPU 22 receives an I-frame last time and a timing at which the CPU 22 receives another I-frame this time in accordance with the storing executed in step S95. The CPU 22 stores the bandwidth obtained in step S81 in the RAM 26 with being associated with the ID information obtained in step S77 of FIG. 9.

When the CPU 22 judges that the compressed image is not I-frame (e.g., NO in step S79), or subsequent to step S81, the CPU 22 judges whether steps S85 to S95 have already been executed for all the communication devices that are connected to the particular conference room, other than the communication device identified by the ID information obtained in step S77 (e.g., step S83). Steps S85 to S95 are a series of processing for transmitting video data selectively. The CPU 22 judges, for example, whether the received video data (e.g., YES in step S75) is video data to be transmitted for each destination device on communication-device basis. When the CPU 22 judges that the received video data is video data to be transmitted for each destination device, the CPU 22 transmits the video data to one or more destination devices. Steps S85 to S95 are executed for all the communication devices that are connected to the particular conference room, other than the communication device identified by the ID information that has been obtained in step S77. When the CPU 22 judges that there is no communication device on which steps S85 to S95 have not been executed yet, i.e., steps S85 to S95 have already been executed for all the communication devices (e.g., YES in step S83), the routine returns to step S61 of FIG. 8 and the CPU 22 executes processing of step S61 and subsequent steps. When the CPU 22 judges that there is one or more communication devices on which steps S85 to S95 have not been executed yet, i.e., steps S85 to S95 have not been executed for all the communication devices (e.g., NO in step S83), the CPU 22 determines one of the one or more communication devices as a target to be processed (e.g., step S85). For example, it is assumed that the received video data is video data transmitted from the communication device 71, i.e., the CPU 22 has obtained the ID information of the communication device 71 in step S77. When steps S85 to S95 have not yet been executed for the communication devices 30 and 75 although steps S85 to S95 have already been executed for the communication devices 72, 73, and 74, one of the communication devices 30 and 75, e.g., the communication device 30, is determined as a target to be processed.

Subsequently, the CPU 22 executes a transfer determining processing (e.g., step S89). A detail of the transfer determining processing will be described later. Subsequent to the transfer determining processing, the CPU 22 judges whether the determination result stored in the RAM 26 indicates that it is necessary to transfer the received video data (hereinafter, referred to as "transfer necessary") (e.g., step S91). When the CPU 22 judges that the determination result indicates "transfer necessary" (e.g., YES in step S91), the CPU 22 controls transmission of the received video data (e.g., step S93). The communication device that is a target to be processed is determined as the destination of the video data. Subsequently, the CPU 22 stores the ID information of the sender device that has transmitted the video data, the ID information of the destination device, a transmission time, and the image type information, for the transmission in step S93 (e.g., step S95). The sender-device's ID information, the destination-device's ID information, the transmission time, and the image type information are stored in a transmission table (not depicted) stored in the RAM 26, for example.

Details of steps S93 and S95 will be described below assuming that the received video data is video data transmitted from the communication device 71, the ID information of the communication device 71 is obtained in step S77, and the communication device 30 is determined as a target to be processed in step S85. In step S93, the CPU 22 determines the communication device 30 as a destination of the video data and outputs, to the communication unit 28, an instruction to transmit the video data received from the communication device 71. Thus, the video data received from the communication device 71 is transmitted to the communication device 30 from the communication unit 28. In step S95, the CPU 22 stores the ID information of the communication device 71, the ID information of the communication device 30, a transmission time, and the image type information in the transmission table stored in the RAM 26.

When the CPU 22 judges that the determination result indicates it is unnecessary to transfer the received video data (hereinafter, referred to as "transfer unnecessary") (e.g., NO in step S91), or subsequent to step S95, the routine returns to step S83 and the CPU 22 executes step S83 and subsequent steps.

Figure 10:
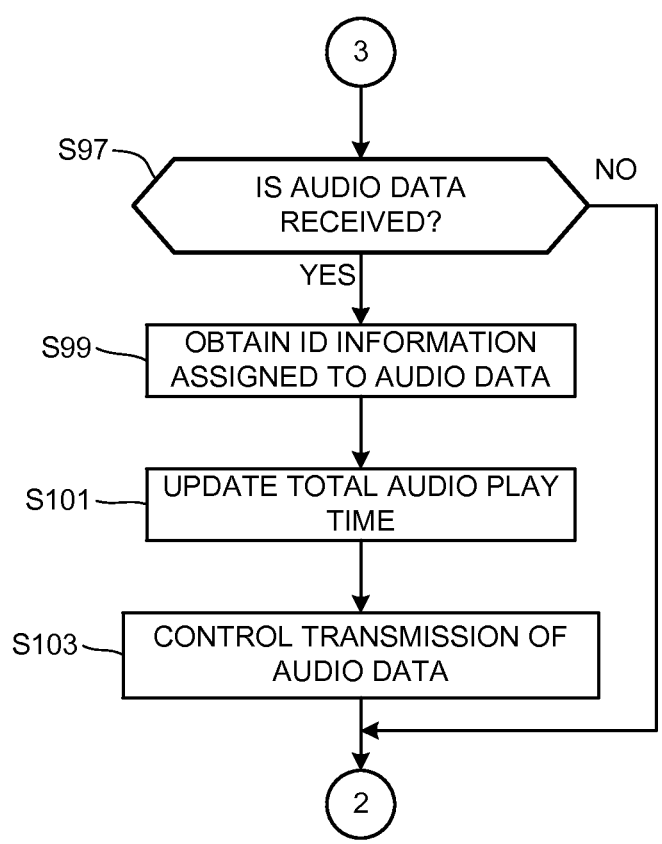
FIG. 10 is a continuation of the flowchart depicting the example transferring processing of FIG. 9 in the illustrative embodiment according to one or more aspects of the disclosure.

In step S97 of FIG. 10, the CPU 22 judges whether the received data is audio data. When the CPU 22 judges that the received data is not audio data (e.g., step NO in step S97), the CPU 22 executes processing appropriate for the received data. Subsequently, the routine returns to step S61 of FIG. 8 and the CPU 22 executes step S61 and subsequent steps.

When the CPU 22 judges that the received data is audio data (e.g., YES in step S97), the CPU 22 obtains the ID information assigned to the audio data (e.g., step S99). The audio data transmitted from the communication device 30 is the audio data transmitted from the communication device 30 in step S19 of FIG. 4. The audio data transmitted from each of the communication devices 71, 72, 73, 74, and 75 is the audio data transmitted by each of the communication devices 71, 72, 73, 74, and 75 in a step corresponding to step S19 of FIG. 4.

Subsequently, the CPU 22 updates the total audio play time associated with the received ID information (e.g., step S101). The total audio play time indicates a total play duration of audio data transmitted from each of the communication devices 30, 71, 72, 73, 74, and 75 during a remote conference. Audio data is transmitted and received in unit of a block having a play duration of a predetermined time via the server 20 in the remote conference system 10. In other words, audio data is transmitted to the server 20 from each communication device at a certain predetermined transmission interval. For example, audio data is transmitted and received in unit of a block having a play duration of 20 milliseconds (msec.). The play duration of 20 msec. of audio data corresponds to the encoding intervals of 20 msec., which is the encoding interval for repeating the audio data transmitting processing (refer to FIG. 4). In the server 20, the total audio play time is stored in a total audio play time table with being associated with the ID information of a corresponding one of the communication devices (refer to FIG. 14). The total audio play time table is stored in, for example, the RAM 26. Each total audio play time indicates a sum of the play time of audio data transmitted from a corresponding one of the communication devices.

In step S101, the CPU 22 accesses the total audio play time table stored in the RAM 26 and adds the play time to the total audio play time associated with the received ID information. In an example, it is assumed that audio data has a play time of 20 msec. and the ID information of the communication device 71 has been obtained in step S99. In this case, the CPU 22 adds 0.02 sec to the total audio play time associated with the ID information of the communication device 71 in the total audio play time table. In another example, it is assumed that audio data has a play time of 20 msec. and the ID information of the communication device 74 has been obtained in step S99. In this case, the CPU 22 adds 0.02 sec to the total audio play time associated with the ID information of the communication device 74 in the total audio play time table.

Subsequently, the CPU 22 controls transmission of the audio data (e.g., step S103). All of the one or more communication devices identified by the respective ID information, other than the ID information of the communication device assigned to the audio data, are determined as a destination of the audio data. For example, it is assumed that the received data is audio data transmitted from the communication device 30. In this case, the CPU 22 determines the communication devices 71, 72, 73, 74, and 75 identified by the respective ID information that are different from the ID information of the communication device 30 assigned to the audio data, as a destination of the video data. Subsequently, the CPU 22 outputs, to the communication unit 28, an instruction to transmit the audio data received from the communication device 30. Thus, the audio data received from the communication device 30 is transmitted to each of the communication devices 71, 72, 73, 74, and 75 from the communication unit 28. Subsequent to step S103, the routine returns to step S61 of FIG. 8 and the CPU 22 executes step S61 and subsequent steps.

<Update Frequency Determining Processing>

Update frequency determining processing, which is executed at step S71 in the transferring processing depicted in FIGS. 8, 9, and 10, will be described referring to FIG. 15 (refer to FIG. 8). The update frequency determining processing is executed for the communication device that is selected in step S69 of FIG. 8. In the illustrative embodiment, the update frequency determining processing is executed five times for five communication devices, other than the communication device that is the sender of the layout information stored in step S65 of FIG. 8, every time the layout information is stored in step S65 (e.g., YES in step S67 of FIG. 8). The CPU 22 executes the update frequency determining processing for one target among the communication devices 30, 71, 72, 73, 74, and 75 to determine update frequency information for the target communication device.

The CPU 22 judges whether the position information indicates the value "0", which indicates that a particular captured image is being displayed (e.g., step S111). The position information is included in the status information associated with the ID information of the communication device that is selected in step S69 and is targeted for the update frequency determining processing. In step S111, the CPU 22 accesses the layout information stored in step S65 of FIG. 8 and executes the determination based on the layout information. For example, it is assumed that the layout information transmitted from the communication device 30 is stored in step S65 with being associated with the ID information "30" (refer to FIG. 11). In this case, when one of the communication devices 71 and 72 has been selected in step S69 among the communication devices 71, 72, 73, 74, and 75, the CPU 22 makes a positive judgment in step S111 (e.g., YES in step S111). When one of the communication devices 73, 74, and 75 has been selected in step S69 among the communication devices 71, 72, 73, 74, and 75, the CPU 22 makes a negative judgment in step S111 (e.g., NO in step S111). Hereinafter, a communication device that is selected in step S69 and targeted for the update frequency determining processing is referred to as "communication device targeted for processing".

When the CPU 22 makes a positive judgment in step S111 (e.g., YES in step S111), the CPU 22 designates update frequency information as update frequency level "5" (e.g., step S113). That is, when video data transmitted from the communication device targeted for processing is displayed, the update frequency information is designated as update frequency level "5". The designated update frequency level "5" is stored in the RAM 26 with being associated with the ID information of the communication device targeted for processing. When the CPU 22 makes a negative judgment in step S111 (e.g., NO in step S111), the CPU 22 designates update frequency information as update frequency level "1" (e.g., step S115). The designated update frequency level "1" is stored in the RAM 26 with being associated with the ID information of the communication device targeted for processing.

Subsequent to step S115, the CPU 22 judge whether the position information indicates the value "1", which indicates that a particular captured image is being hidden (e.g., step S117). In S117, the CPU 22 accesses the layout information stored in step S65 of FIG. 8 and executes the judgment based on the layout information. For example, it is assumed that the layout information transmitted from the communication device 30 is stored in step S65 with being associated with the ID information "30" (refer to FIG. 11). In this case, when one of the communication devices 73 and 74 has been selected in step S69 as the communication device targeted for processing, the CPU 22 makes a positive judgment in step S117 (e.g., YES in step S117). When the communication device 75 is selected as the communication device targeted for processing, the CPU 22 makes a negative judgment in step S117 (e.g., NO in step S117).

When the CPU 22 makes a positive judgment in step S117 (e.g., YES in step S117), the CPU 22 raises, by one level, the update frequency level that is designated in step S115 for the update frequency information and stored in the RAM 26 (e.g., step S119). Thus, the update frequency information stored in the RAM 26 is designated as update frequency level "2". When the CPU 22 makes a negative judgment in step S117 (e.g., NO in step S117), or subsequent to step S119, the CPU 22 judges whether a ratio of the total video play time, which is associated with the ID information of the communication device targeted for processing, to the duration of the ongoing remote conference is greater than or equal to a first reference value (e.g., step S121). In step S121, the CPU 22 accesses the layout information stored in step S65 of FIG. 8 to identify the total video play time associated with the ID information of the communication device targeted for processing. For example, it is assumed that the layout information transmitted from the communication device 30 is stored in step S65 with being associated with the ID information "30" (refer to FIG. 11) and the communication device 73 is selected in step S69 as the communication device targeted for processing. In this case, the CPU 22 identifies the total video play time of 300.0 sec. The CPU 22 determines an elapsed time, which is continuously measured by the timer 27 from the start of the particular remote conference upon the establishment of the connection of the communication device 30 to the particular remote conference room, as the duration of the ongoing remote conference. Subsequently, the CPU 22 determines whether a value obtained by dividing the total video play time by the duration of the ongoing remote conference is greater than or equal to the first reference value. For example, the first reference value may be 0.5 (50%). The first reference value is stored in the storage device 24 with being associated with the programs for executing the update frequency determining processing.

When the ratio of the total video play time associated with the ID information of the communication device targeted for processing to the duration of the ongoing remote conference is greater than or equal to the first reference value (e.g., YES in step S121), the CPU 22 raises, by one level, the update frequency level designated for the update frequency information stored in the RAM 26 (e.g., step S123). When step S119 has already been executed, the update frequency information stored in the RAM 26 is designated as the update frequency level "3". When step S119 has not yet been executed, the update frequency information stored in the RAM 26 is designated as the update frequency level "2".

When the ratio of the total video play time associated with the ID information of the communication device targeted for processing to the duration of the ongoing remote conference is smaller than the first reference value (e.g., NO in step S121), or subsequent to step S123, the CPU 22 judges whether a ratio of the total audio play time associated with the ID information of the communication device targeted for processing to the duration of the ongoing remote conference is greater than or equal to a second reference value (e.g., step S125). For example, the CPU 22 accesses the total audio play time table stored in the RAM 26 (refer to FIG. 14) to identify the total audio play time associated with the ID information of the communication device targeted for processing. As described above, the timer 27 starts measuring an elapsed time upon establishment of a connection of a particular communication device to a particular remote conference room. The CPU 22 judges whether a value obtained by dividing the total audio play time by the duration of the ongoing remote conference is greater than or equal to the second reference value. For example, the second reference value may be 0.2 (20%). The second reference value is stored in the storage device 24 with being associated with the programs for executing the update frequency determining processing.

When the ratio of the total audio play time associated with the ID information of the communication device targeted for processing to the duration of the ongoing remote conference is greater than or equal to the second reference value (e.g., YES in step S125), the CPU 22 raises, by one level, the update frequency level designated for the update frequency information stored in the RAM 26 (e.g., step S127). When the processing of both steps S119 and S123 have already been executed, the update frequency information stored in the RAM 26 is designated as the update frequency level "4". When the processing of one of steps S119 and S123 has already been executed, the update frequency information stored in the RAM 26 is designated as the update frequency level "3".

When the ratio of the total audio play time associated with the ID information of the communication device targeted for processing to the duration of the ongoing remote conference is smaller than the second reference value (e.g., NO in step S125), or subsequent to step S127, the CPU 22 judges whether the value representing the bandwidth is greater than or equal to a threshold value (e.g., step S129). The bandwidth is stored in the RAM 26 with being associated with the ID information of the communication device targeted for processing in step S81 of FIG. 9. For example, the threshold value may be 1 Mbps. The threshold value is stored in the storage device 24 with being associated with the programs for executing the update frequency determining processing.

Figure 8:
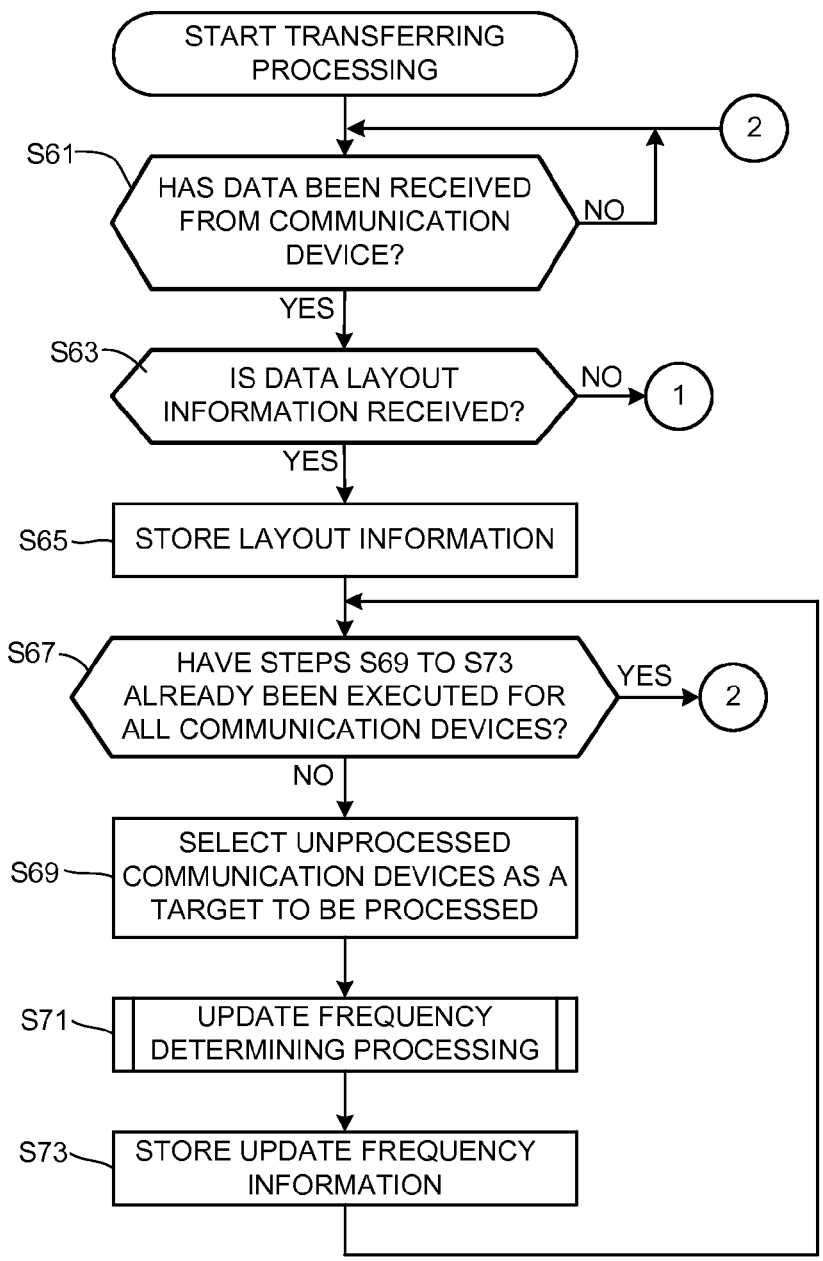
FIG. 8 is a flowchart depicting example transferring processing in the illustrative embodiment according to one or more aspects of the disclosure.

In the illustrative embodiment, for reasons of explanation, in the transferring processing, the CPU 22 judges whether the data received in step S63 of FIG. 8 is layout information. When the CPU 22 makes a negative judgment in step S63 the CPU 22 judges the received data is video data in step S75 of FIG. 9. When the CPU 22 makes a positive judgment in step S75, the CPU 22 obtains the bandwidth in step S81 of FIG. 9. Therefore, it seems that the update frequency determining processing executed in step S71 of FIG. 8 is executed even when step S81 has not been executed yet. Nevertheless, as described above, as a connection for a particular remote conference is established between the server 20 and the communication devices 30, 71, 72, 73, 74, and 75, receiving processing (refer to FIG. 6) including, for example, the video transmitting processing (refer to FIG. 5) is started in each communication device. Subsequently, in step S55 (refer to FIG. 7), the layout information is transmitted. Therefore, the CPU 22 may obtain the bandwidth, which is a target for comparison, from the RAM 26. For example, when there is no bandwidth stored in the RAM 26 at a timing of execution of step S129 under special condition, the CPU 22 determines the bandwidth as 0 Mbps.

When the CPU 22 judges that the value representing the bandwidth is greater than or equal to the threshold value (e.g., YES in step S129), the CPU 22 raises, by one level, the update frequency level designated for the update frequency information (e.g., step S131). When steps S119, S123, and S127 have already been executed, the update frequency information stored in the RAM 26 is designated as the update frequency level "5". When two of steps S119, S123, and S127 have already been executed, the update frequency information stored in the RAM 26 is designated as the update frequency level "4". When one of steps S119, S123, and S127 has already been executed, the update frequency information stored in the RAM 26 is designated as the update frequency level "3".

When the CPU 22 judges that the value representing the bandwidth is smaller than the threshold value (e.g., NO in step S129), or subsequent to step S113 or S131, the CPU 22 ends the update frequency determining processing and the routine returns to step S73 of FIG. 8.

<Transfer Determining Processing>

Transfer determining processing executed in step S89 (refer to FIG. 9) of the transferring processing in FIGS. 8, 9 and 10 will be described referring to FIG. 16. In the description for the transfer determining processing, the video data that contributes to the positive judgment in step S75 of FIG. 9 (e.g., YES in step S75) is referred to as "new video data".

Subsequent to starting the transfer determining processing, the CPU 22 obtains the update frequency information for ID information (target), which is obtained in step S77 and associated with the ID information of the communication device selected in step S85 in the update frequency setting (refer to FIG. 13) (e.g., step S151). Subsequently, the CPU 22 judges whether the update frequency information obtained in step S151 indicates that the compressed image in the new video data is determined as a non-target for transmission (e.g., step S153). The type of the compressed image in the new video data is identified based on the image type information obtained in step S77 of FIG. 9. When the CPU 22 judges that the update frequency information indicates that the compressed image in the new video data is not determined as a non-target for transmission (e.g., NO in step S153), the CPU 22 judges whether a value representing a time period elapsed between a timing of the last-time transmission of an I-frame and a timing of execution of step S151, i.e., the current time, is greater than a value representing the minimum I-frame transmission interval specified in the update frequency information obtained in step S151 (e.g., step S155).

For example, step S155 is executed as described below. The CPU 22 identifies the transmission time of the last-time transmission of an I-frame from the transmission table stored in the RAM 26 in which various information has been stored in step S95 of FIG. 9. The ID information obtained in step S77 of FIG. 9 as the ID information of the sender device of the video data, and the ID information of the communication device determined in step S85 of FIG. 9 as the ID information of the destination of the video data are associated with the last I-frame of which transmission time has been identified. The CPU 22 obtains the current time from the timer 27. In the identification of the transmission time of the last-time transmission of the I-frame, the type of the compressed image is determined based on the image type information stored in the transmission table. The CPU 22 obtains an elapsed time based on the last transmission time and the current time to determine the relationship between the elapsed time and the minimum I-frame transmission interval. When the CPU 22 judges that the value representing the elapsed time is greater than the value representing the minimum I-frame transmission interval, the CPU 22 makes a positive judgment in step S155 (e.g., YES in step S155). When the value representing the elapsed time is smaller than or equal to the value representing the minimum I-frame transmission interval, the CPU 22 makes a negative judgment in step S155 (e.g., NO in step S155). In other embodiments, for example, when the value representing the elapsed time is equal to the value representing the minimum I-frame transmission interval, the CPU 22 may make a positive judgment in step S155 (e.g., YES in step S155).

When the CPU 22 makes a positive judgment in step S155 (e.g., YES in step S155), the CPU 22 stores a determination result indicating "transfer necessary" in the RAM 26 (e.g., step S157). When the compressed image in the new video data is a compressed image type that does not relate to the minimum I-frame transmission interval, the CPU 22 makes a positive judgment in step S155 (e.g., YES in step S155). In the illustrative embodiment, the minimum interval is the minimum I-frame transmission interval. Therefore, the compressed image type that does not relate to the minimum I-frame transmission interval may be a P-frame or a B-frame. When the CPU 22 makes a positive judgment in step S153 (e.g., YES in step S153) or when the CPU 22 makes a negative judgment in step S155 (e.g., NO in step S155), the CPU 22 stores a determination result indicating "transfer unnecessary" in the RAM 26 (e.g., step S159).

Steps S151 to S159 will be described assuming that the new video data is video data received from the communication device 73, the ID information of the communication device 73 is obtained in step S77 of FIG. 9, and the communication device 30 is determined as a target to be processed in step S85 of FIG. 9. In the update frequency setting associated with the ID information of the communication device 30, the update frequency information for the ID information of each of the communication devices 71, 72, 73, 74, and 75 is as shown in FIG. 12. In step S151, the CPU 22 obtains the update frequency information for the ID information "73", associated with the ID information of the communication device 30 (sender), based on the update frequency setting (refer to FIG. 12) stored in the RAM 26. According to the update frequency setting depicted in FIG. 12, in this case, the CPU 22 obtains the update frequency level "3".

When the compressed image in the new video data is I-frame, the CPU 22 makes a negative judgment in step S153 (e.g., NO in step S153). When 300 msec. has elapsed from the transmission time of the last-time transmission of an I-frame (e.g., YES in step S155), the CPU 22 stores a determination result indicating "transfer necessary" in the RAM 26 (e.g., step S157). When 300 msec. has not yet elapsed from the transmission time of the last-time transmission of an I-frame (e.g., NO in step S155), the CPU 22 stores a determination result indicating "transfer unnecessary" in the RAM 26 (e.g., step S159). When the compressed image in the new video data is one of P-frame and B-frame, the CPU 22 makes a positive judgment in step S153 (e.g., YES in step S153) and stores a determination result indicating "transfer unnecessary" in the RAM 26 (e.g., step S159).

Figure 9:
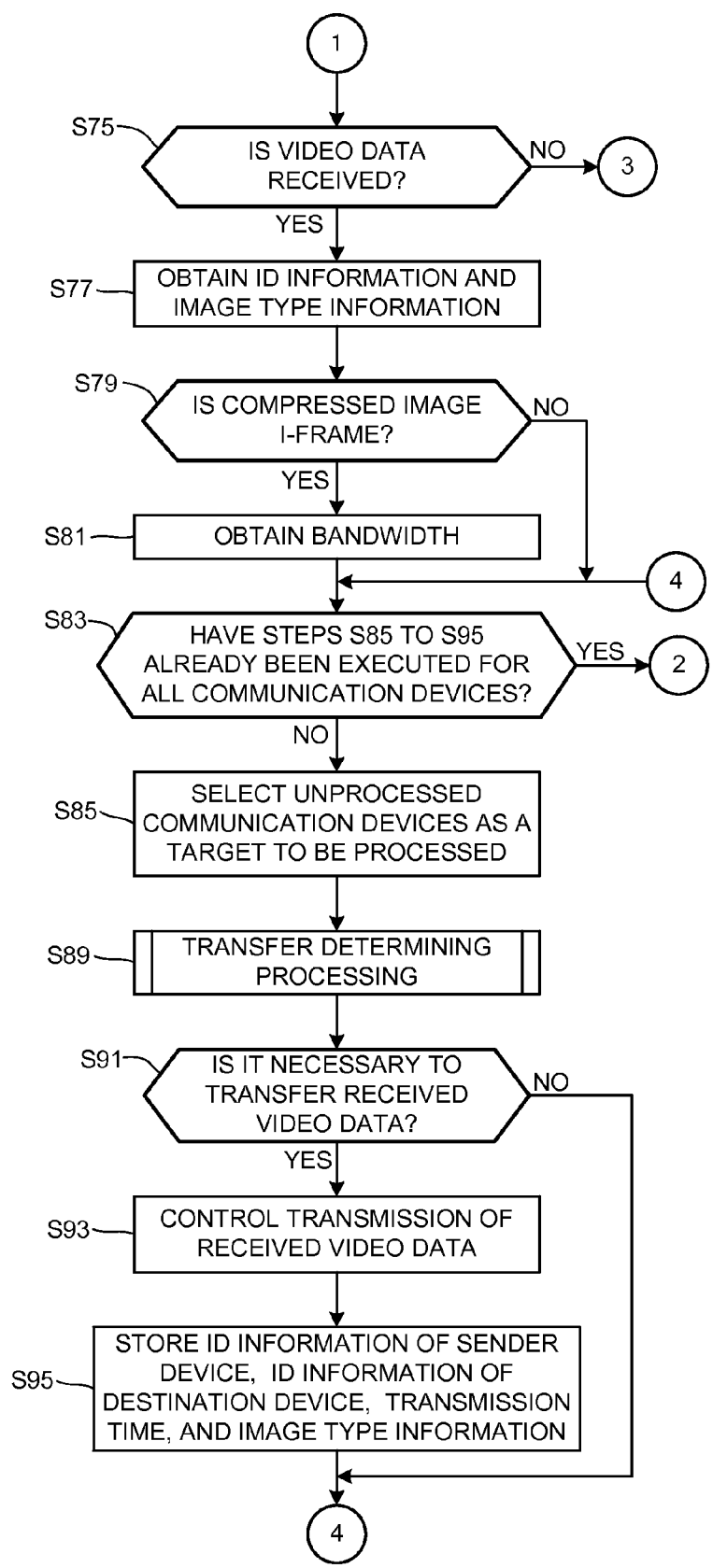
FIG. 9 is a continuation of the flowchart depicting the example transferring processing of FIG. 8 in the illustrative embodiment according to one or more aspects of the disclosure.

Subsequent to step S157 or S159, the CPU 22 ends the transfer determining processing, and the routine returns to step S91 of FIG. 9.

<Effects of Illustrative Embodiment>

According to the illustrative embodiment, one or more effects described below are obtained.

(1) In the server 20, in step S65 (refer to FIG. 8), the layout information received via the communication unit 28 is stored. The layout information is transmitted from one of the communication devices 30, 71, 72, 73, 74, and 75 (refer to step S55 of FIG. 7). In step S111, it is judged whether the position information associated to the ID information of the communication device indicates the value "0", which indicates that a particular captured image is being displayed. The communication device is selected in step S69 (refer to FIG. 8) and is a target for the update frequency determining processing. When a positive judgment is made in step S111, the update frequency information is designated as the highest update frequency level "5" (e.g., step S113 refer to). When a negative judgment is made in step S111, the update frequency information is designated as one of the update frequency levels "1", "2", "3", and "4", which are lower levels than the update frequency level "5" (refer to step S115, S119, S123, S127 or S131).

In the server 20, judgments (e.g., step S153 or S155 of FIG. 16) are made based on the update frequency information stored as the update frequency setting in step S73 in FIG. 8. One of the determination result indicating "transfer necessary" and the determination result indicating "transfer unnecessary" is stored (e.g., step S157 or S159 of FIG. 16). In the server 20, when the determination result indicates "transfer necessary" (e.g., YES in step S93 of FIG. 9), video data is transmitted to the communication device determined as a target to be processed in step S85 of FIG. 9 (e.g., step S93 in FIG. 9). When the determination result indicates "transfer unnecessary" (e.g., NO in step S91 of FIG. 9), transmission of video data is not performed.

Therefore, this configuration may enable to determine compressed images of particular types as a non-target for transmission, in video data corresponding to a captured image that is not displayed within the video display region B of the display 38 of the communication device 30. That is, this configuration may disable the server 20 to transmit, to the communication device 30, video data including the compressed images determined as a non-target for transmission.

Figure 15:
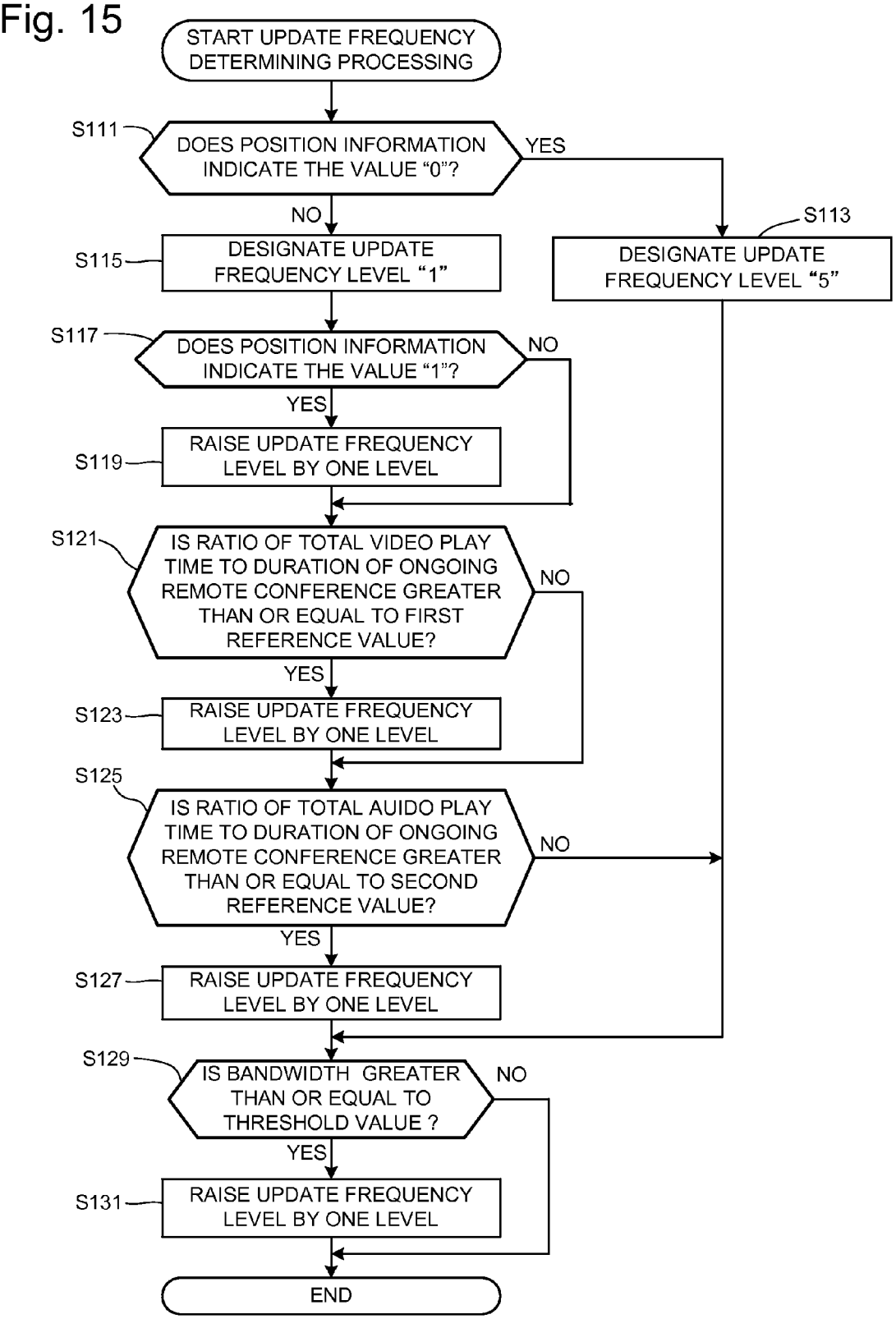
FIG. 15 is a flowchart depicting example update frequency determining processing in the illustrative embodiment according to one or more aspects of the disclosure.

For example, when a particular captured image is hidden in the communication device 30, in other words, when the position information for the particular captured image indicates one of the values "1" and "2" (e.g., NO in step S111 in FIG. 15), the update frequency information is designated as one of the update frequency levels "2", "3", "4", and "5" (e.g., step S119, S123, S127 or S131 of FIG. 15) if a positive judgment is made in at least one of steps S117, S121, S125, and S129 of the update frequency determining processing (refer to FIG. 15). When the update frequency information is designated as one of the update frequency levels "2", "3", "4", and "5", video data including at least I-frames is transmitted from the server 20 to the communication device 30 even if the video data is video data corresponding to the hidden captured image (e.g., FIG. 13, NO in step S153, and step S157 of FIG. 16, YES in step S91, and step S93 of FIG. 9). Therefore, for example, when a swiping operation is performed in order to display a hidden captured image, the video data including the compressed image that is a target for transmission is obtained (e.g., YES in step S37 of FIG. 6) and thus the captured image that includes the compressed image and corresponds to the video data may be displayed in the communication device 30 (e.g., step S43 of FIG. 6). In the remote conference system 10, therefore, this configuration may enable to display a hidden captured image smoothly in a predetermined communication device (e.g., the communication device 30) while restricting increase of the amount of video data to be communicated.

(2) The layout information including the position information indicating the value "1" is generated for a particular area of the video layout region A which is positioned out of the video display region B and is positioned within the reference distance WC with reference to a particular reference edge in the direction opposite to the moving direction (refer to FIG. 2) (e.g., step S55 of FIG. 7). The value "1" that may be position information is higher order value than the value "2" which may be position information that indicates that a particular area is positioned out of the area corresponding to the reference distance WC. The position information is transmitted to the server 20. In the server 20, when the position information included in the layout information indicates the value "1" (e.g., YES in step S117 of FIG. 15), the update frequency level designated for the update frequency information is raised by one level (e.g., step S119 of FIG. 15). Therefore, the update frequency information assigned to video data corresponding to a captured image positioned out of the video display region B may be changed from the value "1" to the value "2" with reference to the reference distance WC. Therefore, when the hidden captured image is displayed, the captured image may be displayed owing to receipt of I-frames, which are determined as a target for transmission at the update frequency level "2". In the illustrative embodiment, both the moving direction and the direction opposite to the moving direction may be referred to as a direction corresponding to the moving direction. The direction corresponding to the moving direction may be, for example, the horizontal direction (refer to FIG. 2).

(3) It is judged whether the ratio of the total video play time, which is associated with the ID information of the communication device targeted for processing, to the duration of the ongoing remote conference is greater than or equal to the first reference value (e.g., step S121 of FIG. 15). When the ratio is greater than or equal to the first reference value (e.g., YES in step S121), the update frequency level designated for the update frequency information is raised by one level (e.g., step S123). Therefore, the update frequency information for video data corresponding to the captured image that is not displayed within the video display region B may be changed appropriate to the total video play time. For example, when step S117 has not been executed, the update frequency level designated for the update frequency information is changed from the update frequency level "1" to the update frequency level "2". When step S117 has already been executed, the update frequency level designated for the update frequency information is changed from the update frequency level "2" to the update frequency level "3". At the update frequency level "2" or "3", an I-frame determined as a target for transmission may enable the captured image to be displayed. Raising the update frequency level designated for the update frequency information from the update frequency level "2" to the update frequency level "3" may enable to shorten the minimum I-frame transmission interval (e.g., 1700 msec. shortened), whereby the image switching interval of the captured image in display duration of one frame may be shortened. Thus, reproduction quality may be increased.

(4) It is judged whether the ratio of the total audio play time, which is associated with the ID information of the communication device targeted for processing, to the duration of the ongoing remote conference is greater than or equal to the second reference value (e.g., step S125 of FIG. 15). When the ratio is greater than or equal to the second reference value (e.g., YES in step S125), the update frequency level designated for the update frequency information is raised by one level (e.g., step S127). Therefore, the update frequency information for video data corresponding to the captured image that is not displayed within the video display region B may be changed appropriate to the total video play time. For example, when both steps S119 and S123 have not been executed, the update frequency level designated for the update frequency information is changed from the update frequency level "1" to the update frequency level "2". When one of step S119 and S123 has been executed, the update frequency level designated for the update frequency information is changed from the update frequency level "2" to the update frequency level "3". When both steps S119 and S123 have been executed, the update frequency level designated for the update frequency information is changed from the update frequency level "3" to the update frequency level "4". At the update frequency level "2" or "3", an I-frame determined as a target for transmission may enable the captured image to be displayed. At the update frequency level "4", a P-frame is also determined as a target for transmission. Therefore a P-frame as well as an I-frame may enable the captured image to be displayed. Raising the update frequency level designated for the update frequency information from the update frequency level "3" to the update frequency level "4" may enable to shorten the minimum I-frame transmission interval (e.g., 300 msec. shortened) and to obtain P-frames, whereby the image switching interval of the captured image in display duration of one frame may be shortened. Thus, reproduction quality may be further increased. The effects obtained due to the raising of the update frequency information from the update frequency level "2" to the update frequency level "3" are as described above.

<Modifications>

One or more aspects of the disclosure according to the illustrative embodiment may be modified as described below. One or more aspects of the disclosure according to various modifications may be combined appropriately. Other embodiments that adopt one or more aspects described below may provide the same effects as the effects provided by the above-described embodiment.

(1) In the above-described illustrative embodiment, the video layout region A is defined by the layout setting that defines that the areas A1, A2, A3, A4, and A5 are arranged along the horizontal direction and the captured images 381, 382, 383, 384, and 385 are positioned in the areas A1, A2, A3, A4, and A5, respectively (refer to FIG. 2). In other embodiments, for example, the layout setting may define the video layout area such that the areas A1, A2, A3, A4, and A5 are arranged along the vertical direction and the captured images 381, 382, 383, 384, and 385 are positioned in the areas A1, A2, A3, A4, and A5, respectively, arranged along the vertical direction. In this case, elements corresponding to the widths WA and WB, the reference distance WC, and the distance WD with reference to the horizontal direction may be defined with reference to the vertical direction. The moving direction may include an upward direction and downward direction in the vertical direction. According to the drawing depicted in FIG. 2, the vertical direction is a direction perpendicular to the horizontal direction indicated by a bi-directional arrow.

(2) In the above-described illustrative embodiment, for the arrangement of the captured images 381, 382, 383, 384, and 385 in accordance with the layout setting, the areas A1, A2, A3, A4, and A5 are defined in the video layout region A (refer to FIG. 3). In other embodiments, for example, the areas in which the captured images 381, 382, 383, 384, and 385 are positioned, respectively, in the video layout region A may be identified using a coordinate system. In this case, a particular area of the video layout region A displayed within the video display region B may also be identified using the coordinate system.

(3) In the above-described illustrative embodiment, the position information of the status information includes the value "0" which indicates a particular captured image is being displayed, and the values "1" and "2", each of which indicates a particular captured image is being hidden. In other embodiments, for example, information that is equal to the position information may be obtained based on information relating to the video layout region and information that identifies a position of a particular area of the video layout region A whether the particular area is positioned within or out of the video display region B, for example. The information relating to the video layout region A may be, for example, information which indicates the arrangement of the plurality of areas in the video layout region A based on the layout setting (e.g., M rows by N columns) and information in which the plurality of areas and the ID information of the communication devices are associated with each other. In the server 20, the CPU 22 may obtain such information (e.g., YES in step S63 of FIG. 8). The CPU 22 may identify a feature that is equal to the position information, based on the receive information.

Figure 4:
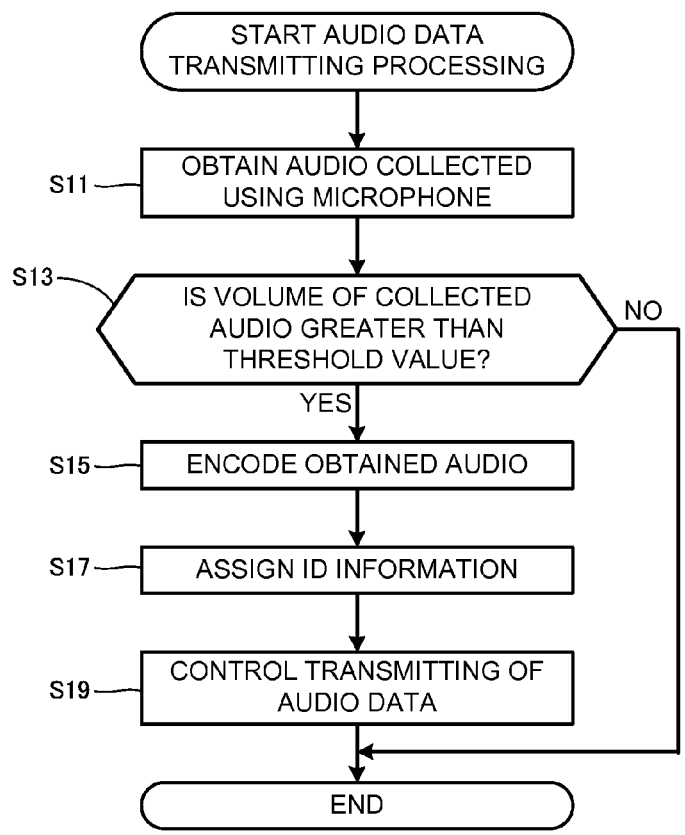
FIG. 4 is a flowchart depicting example audio data transmitting processing in the illustrative embodiment according to one or more aspects of the disclosure.

(4) In the above-described illustrative embodiment, in step S13 of the audio data transmitting processing depicted in FIG. 4, when the value representing the volume of the audio obtained in step S11 is equal to the threshold value, a negative judgment is made. In other embodiments, for example, in step S13, a judgment may be made based on whether the value representing the volume of the audio obtained in step S11 is greater than or equal to the threshold value. In this case, when the value representing the volume is equal to the threshold value, a positive judgment may be made.

(5) In the above-described illustrative embodiment, in step S81 (refer to FIG. 9), the bandwidth is obtained based on the interval of obtaining an I-frame. In other embodiments, for example, the bandwidth may be obtained, for example, on a group-of-pictures (GOP structure) basis. In the above-described illustrative embodiment, the description has been made in the case where the bandwidth of video data is used. In other embodiments, for example, instead of or in addition to video data, a bandwidth of other data communicated in the remote conference system 10 (e.g., audio data, common material data, or control data) may be used.

(6) In the above-described illustrative embodiment, when a negative judgment is made in step S111 of FIG. 15, the update frequency information is designated as the update frequency level "1" in step S115. When a negative judgment is made in each of steps S117, S121, S125, and S129, the update frequency level designated for the update frequency information is raised by one level. In other embodiments, for example, the update frequency information may be updated using scores. In this case, for example, the update frequency information and a score are associated with each other such that "0 points" indicates the update frequency level "1", "20 points" indicates the update frequency level "2", "40 points" indicates the update frequency level "3", "60 points" indicates the update frequency level "4", and "80 points" indicates the update frequency level "5". The update frequency information may be designated in accordance with the score. For example, when a negative judgment is made in step S111, in step S115, the score is set to 0 points and this score is stored in the RAM 26. When a positive judgment is made in step S117, in step S119, the CPU 22 adds 20 points to the score. In this case, the score of "20 points" is stored in the RAM 26. When a positive judgment is made in step S121, in step S123, the CPU 22 adds "20 points" to the store stored in the RAM 26. When a positive judgment is made in step S125, in step S127, the CPU 22 adds "20 points" to the score stored in the RAM 26. When a positive judgment is made in step S129, in step S131, the CPU 22 adds "20 points" to the score stored in the RAM 26. Subsequently, the CPU 22 designates the update frequency information in accordance with the final score stored in the RAM 26. For example, when the final score stored in the RAM 26 is "60 points", the CPU 22 designates the update frequency information as the update frequency level "4" and determines the update frequency information as the update frequency level "4" in step S73 of FIG. 8.

In step S121, when the ratio of the total video play time associated with the ID information of the communication device targeted for processing to the duration of the ongoing remote conference is equal to the first reference value, a positive judgment is made. In other embodiments, for example, in step S121, a judgment may be made based on whether the ratio of the total video play time associated with the ID information of the communication device targeted for processing to the duration of the ongoing remote conference is greater than the first reference value. In other words, when the ratio is equal to the first reference value, a negative judgment may be made in step S121.

In step S125, when the ratio of the total audio play time associated with the ID information of the communication device targeted for processing to the duration of the ongoing remote conference is equal to the second reference value, a positive judgment is made. In other embodiments, for example, in step S125, a judgment may be made based on whether the ratio of the total audio play time associated with the ID information of the communication device targeted for processing to the duration of the ongoing remote conference is greater than the second reference value. In other words, when the ratio is equal to the second reference value, a negative judgment may be made in step S125.

In the above-described illustrative embodiment, in step S129, when the value representing the bandwidth is equal to the threshold value, a positive judgment is made. In other embodiments, for example, in step S129, a judgment may be made based on whether the value representing the bandwidth is greater than the threshold value. In other words, when the value representing the bandwidth is equal to the threshold value, a negative judgment may be made in step S129.

The order in which judgments in steps S117, S121, S125, and S129 are performed may be changed. In other embodiments, for example, the judgment performed in accordance with the condition of step S121 may be performed at the timing of step S117 executed in the above-described illustrative embodiment. The judgment performed in accordance with the condition of step S125 may be performed at the timing of step S121 executed in the above-described illustrative embodiment. The judgment performed in accordance with the condition of step S129 may be performed at the timing of step S125 executed in the above-described illustrative embodiment. The judgment performed in accordance with the condition of step S117 may be performed at the timing of step S129 executed in the above-described illustrative embodiment.

Figure 16:
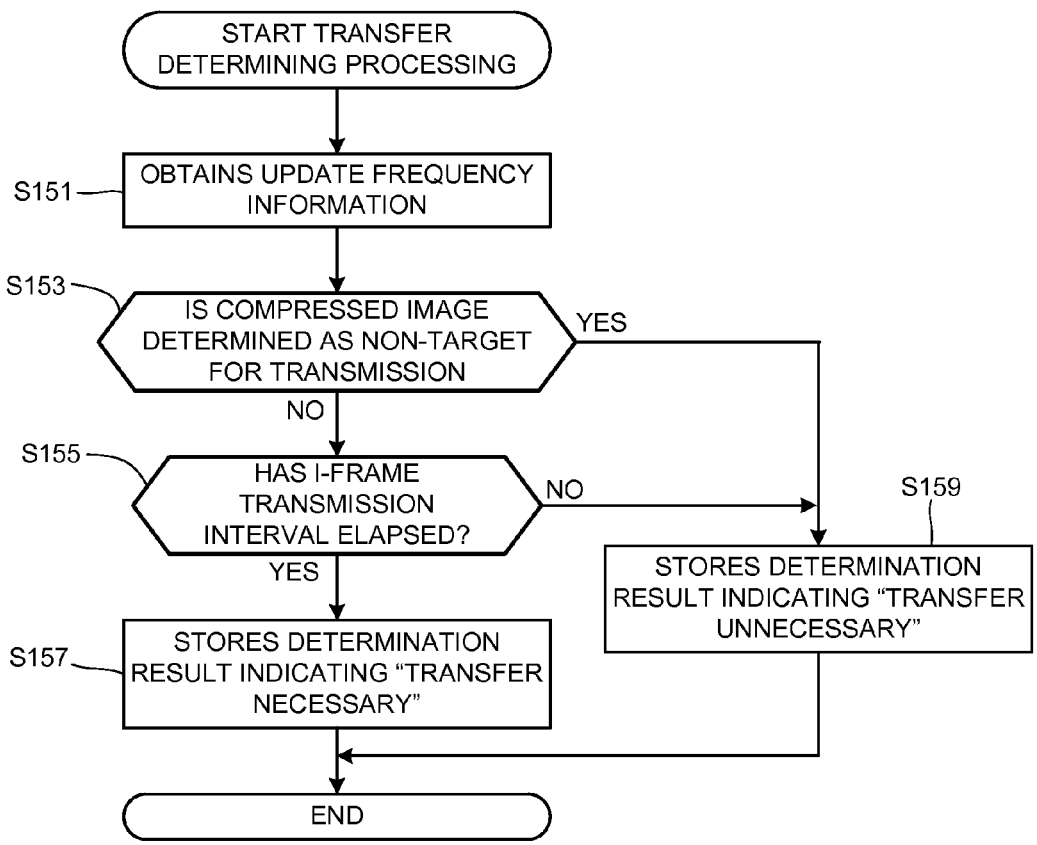
FIG. 16 is a flowchart depicting example transfer determining processing in the illustrative embodiment according to one or more aspects of the disclosure.

(7) In the above-described illustrative embodiment, a judgment is made in step S153 of FIG. 16 based on whether the update frequency information obtained in step S151 indicates the compressed image included in the new video data is determined as a non-target for transmission. In other embodiments, for example, in step S153, a judgment may be made based on whether the update frequency information obtained in step S151 indicates the compressed image included in the new video data is determined as a target for transmission. In this case, when the compressed image is determined as a target for transmission, the CPU 22 may make a positive judgment and the routine may proceed to step S155. When the compressed image is determined as a non-target for transmission, the CPU 22 may make a negative judgment and the routine proceed to step S159.

(8) In the above-described illustrative embodiment, the server 20 transmits video data to each appropriate destination device. The sender device of the video data reproduces video from video data obtained therein and displays thereon a captured image of itself generated through the reproduction. In other embodiments, for example, the server 20 may be configured to transmit the video data to the sender device. In this case, the sender device may be configured to display a captured image corresponding to the received video data based on the own video data transmitted from the server 20. In this case, the layout information may include the status information on the captured image of the sender device corresponding to video data. The status information is associated with the ID information of the sender device. In the server 20, the CPU 22 may be configured to execute the update frequency determining processing (refer to FIG. 15) for each communication device identified by the ID information included in the layout information. The determined update frequency information may be stored in the update frequency setting (e.g., step S73 of FIG. 8). The CPU 22 may be configured to also execute the transfer determining processing (refer to FIG. 16) for each of the communication devices 30, 71, 72, 73, 74, and 75, and one of the determination result indicating "transfer necessary" and the determination result indicating "transfer unnecessary" may be stored (e.g., step S157 or S159). In step S91 of FIG. 9, a determination is made as to whether video data of the sender device is transmitted to the sender device itself. When a positive judgment is made in step S91 (e.g., YES in step S91), the CPU 22 controls the transmission of the video data (e.g., step S93 of FIG. 9).

What is claimed is:

1. A non-transitory computer-readable medium storing computer readable instructions that, when executed by a processor of a server configured to conduct a remote conference via a network, perform a method comprising:

a first obtaining operation obtaining video data and identification information via a communication unit of the server connected to the network, the video data being based on an image captured in each of a plurality of communication devices participating in a remote conference, the video data including a plurality of inter-frame coded image data and a plurality of intra-frame coded image data, and the identification information identifying each of the plurality of communication devices;

a second obtaining operation obtaining layout information from a first communication device via the communication unit of the server, the layout information including a portion of identification information and status information associated with the identification information in a video layout region of the first communication device, the portion of the identification information identifying a second communication device different from the first communication device, the status information relating to a display condition of each of a plurality of captured images in the video layout region of the first communication device, each of the plurality of captured images corresponding to the video data of a plurality of communication devices other than the first communication device and including the second communication device;

a judgment operation judging, based on status information associated with identification information of the second communication device in the layout information, whether a specific captured image is included in a video display region, the specific captured image corresponding to the video data of the second communication device; and a determination operation determining update frequency information of the first communication device in response to the judgment operation judging that the specific captured image is positioned outside the video display region, the update frequency information indicating a timing at which the video data of the second communication device corresponding to the specific captured image positioned outside the video display region is to be updated, and the update frequency information identifying at least a portion of the plurality of inter-frame coded image data included in the video data of the second communication device as a non-target for transmission.

2. The non-transitory computer-readable medium according to claim 1, wherein the method further comprises:

a transmission control operation controlling transmission of, in response to the judging that the specific captured image is positioned outside the video display region, the video data of the second communication device in which the portion of the plurality of inter-frame coded image data identified as a non-target for transmission are not included and at least a portion of the plurality of intra-frame coded image data are included.

3. The non-transitory computer-readable medium according to claim 2, wherein the determining operation further comprises determining the update frequency information for identifying a portion of the plurality of intra-frame coded image data as a non-target for transmission for the video data of the second communication device in response to the judgment operation judging that the captured image corresponding to the video data of the second communication is positioned outside the video display region, and wherein the transmission control operation controls transmission of the video data of the second communication device in which the portion of the plurality of intra-frame coded image data, identified as the non-target for transmission, are skipped.

4. The non-transitory computer-readable medium according to claim 3, wherein the method further comprises:

judging, in response to obtaining the video data of the second communication device and the identification information by the first obtaining operation, whether a specific coded image data included in the video data of the second communication device is a non-target for transmission identified by the update frequency information of the first communication, wherein the transmission control operation further comprises:

causing transmission of, in response to judging that the specific coded image data is a target for transmission, the video data of the second communication device including the specific coded image data; and in response to judging that the specific coded image data is a non-target for transmission, not performing transmission of the video data of the second communication device including the specific coded image data to the first communication device via the communication unit of the server.

5. The non-transitory computer-readable medium according to claim 1, wherein the determining operation further comprises determining all of the plurality of inter-frame coded image data included in the video data of the second communication device as a non-target for transmission.

6. The non-transitory computer-readable medium according to claim 1, wherein the status information, included in the layout information from the first communication device, includes position information indicating a distance to an edge of the video display region in a first direction, the first direction corresponding to a moving direction of the plurality of captured images in the video layout region, and wherein the determining operation further comprises:

determining the update frequency information to identify a portion of the plurality of inter-frame coded image data as a non-target for transmission to be a first interval for the video data of the second communication device when the position information included in the status information associated with the identification information of the second communication device indicates that the distance is less than or equal to a reference distance; and determining the update frequency information to identify a portion of the plurality of inter-frame coded image data as a non-target for transmission to be a second interval for the video data of the second communication device when the position information included in the status information associated with the identification information of the second communication device indicates that the distance is greater than the reference distance, the second interval being greater than the first interval.

7. The non-transitory computer-readable medium according to claim 6, wherein the reference distance corresponds to a width of the video display region in the moving direction.

8. The non-transitory computer-readable medium according to claim 1, wherein the status information, included in the layout information from the first communication device, includes a total video play time, the total video play time indicating a total display duration of each of the plurality of captured images in the video display region, wherein the determining operation further comprises:

determining the update frequency information to identify a portion of the plurality of inter-frame coded image data as a non-target for transmission to be a first interval for the video data of the second communication device when the total video play time included in the status information associated with the identification information of the second communication device is a first total video play time; and determining the update frequency information to identify a portion of the plurality of inter-frame coded image data as a non-target for transmission to be a second interval for the video data of the second communication device when the total video play time included in the status information associated with the identification information of the second communication device is a second total video play time.

9. The non-transitory computer-readable medium according to claim 8,
wherein the first total video play time is greater than the second total video play time, and
wherein the first interval is less than the second interval.

10. The non-transitory computer-readable medium according to claim 1, further comprises:
a third obtaining operation obtaining audio data and the identification information via the communication unit of the server, the audio data being based on audio collected in each of the plurality of communication devices identified by the identification information; and
a storing operation storing a total audio play time of the audio data and the identification information in association with each other, the total audio play time indicating a total play duration of the audio data in a specific communication device,
wherein the determining operation further comprises:
determining the update frequency information to identify a portion of the plurality of inter-frame coded image data as a non-target for transmission to be a first interval for the video data of the second communication device when the total audio play time associated with the identification information of the second communication device is a first total audio play time; and
determining the update frequency information to identify a portion of the plurality of inter-frame coded image data as a non-target for transmission to be a second interval for the video data of the second communication device, when the total audio play time associated with the identification information of the second communication device is a second total audio play time.

11. The non-transitory computer-readable medium according to claim 10,
wherein the first total audio play time is greater than the second total audio play time, and
wherein the first interval is less than the second interval.

12. A server configured to conduct a remote conference via a network comprising:
a communication unit configured to connect to the network;
a processor; and
a memory storing computer readable instructions that, when executed by the processor, perform a method comprising:
a first obtaining operation obtaining video data and identification information via the communication unit of the server connected to the network, the video data being based on an image captured in each of a plurality of communication devices conducting a remote conference, the video data including a plurality of inter-frame coded image data and a plurality of intra-frame coded image data, and the identification information identifying each of the plurality of communication devices;
a second obtaining operation obtaining layout information from a first communication device via the communication unit, the layout information including at least a portion of the identification information and status information associated with the identification information in a video layout region of the first communication device, the portion of the identification information identifying a portion of the plurality of communication devices including a second communication device different from the first communication device, the status information relating to a display condition of each of a plurality of captured images in the video layout region of the first communication device, each of the plurality of captured images corresponding to the video data of the portion of the plurality of communication devices;
a judgment operation judging, based on status information associated with identification information of the second communication device in the layout information, whether a specific captured image is included in a video display region of the first communication device, the specific captured image corresponding to the video data of the second communication device; and
a determination operation determining update frequency information of the first communication device in response to judging that the specific captured image is positioned outside the video display region, the update frequency information indicating a timing at which the video data of the second communication device corresponding to the specific captured image positioned outside the video display region is to be updated, and the update frequency information identifying at least a portion of the plurality of inter-frame coded image data included in the video data of the second communication device as a non-target for transmission.

13. The server according to claim 12, wherein the method further comprises:
a transmission control operation controlling transmission of, in response to judging that that the specific captured image is positioned outside the video display region, the video data of the second communication device in which the portion of the plurality of inter-frame coded image data identified as a non-target for transmission are not included.

14. A non-transitory computer-readable medium storing computer readable instructions that, when executed by a processor of a server configured to conduct a remote conference via a network, perform a method comprising:
a first obtaining operation obtaining video data and identification information via a communication unit of the server connected to the network, the video data being based on an image captured in each of a plurality of communication devices participating in a remote conference, the video data including a plurality of inter-frame coded image data and a plurality of intra-frame coded image data, and the identification information identifying each of the plurality of communication devices;
a second obtaining operation obtaining layout information and identification information from each of the plurality of communication devices via the communication unit of the server, the layout information including at least a portion of the identification information and status information associated with the identification information in a video layout region of a specific communication device, the status information relating to a display condition of each of a plurality of captured images in a video layout region of the specific communication device, each of the plurality of captured images corresponding to the video data of a portion of the plurality of communication devices corresponding to the portion of the identification information, the specific communication device being one of the plurality of communication devices;

a storing operation storing, in a storage device of the server, the layout information and the identification information in association with each other;

a judgment operation judging, for the layout information associated with the identification information other than identification information of the specific communication device, whether a specific captured image is included in a video display region of each of the plurality of communication devices other than the specific communication device based on status information associated with the identification information of the specific communication device in the layout information associated with the identification information other than the identification information of the specific communication device; and a determination operation determining update frequency information in response to the judgment operation judging that the specific captured image is positioned outside the video display region, the update frequency information indicating a timing at which the video data of the specific communication device corresponding to the specific captured image positioned outside the video display region is to be updated, and the update frequency information identifying at least a portion of the plurality of inter-frame coded image data included in the video data of the specific communication device as a non-target for transmission.

15. The non-transitory computer-readable medium according to claim 14, wherein the method further comprises:

a transmission control operation controlling transmission of, in response to judging that the specific captured image is positioned outside the video display region, the video data of the specific communication device to a communication device identified by identification information associated with layout information which is a subject to the judgment operation, the portion of the plurality of inter-frame coded image data identified as a non-target for transmission are not included in the video data of the specific communication device to be transmitted.

* * * * *